United States Patent [19]

Boggs, III

[11] Patent Number: 5,446,327

[45] Date of Patent: Aug. 29, 1995

[54] SHAFT MOUNTED EDDY CURRENT DRIVE

[76] Inventor: Paul D. Boggs, III, 8265 Lupine Cir., Fort Worth, Tex. 76135

[21] Appl. No.: 179,485

[22] Filed: Jan. 7, 1994

Related U.S. Application Data

[63] Continuation-in-part of Ser. No. 56,132, Apr. 30, 1993, which is a continuation-in-part of Ser. No. 35,981, Mar. 18, 1993.

[51] Int. Cl.⁶ ............................................. H02K 49/00
[52] U.S. Cl. ................................... 310/105; 310/95
[58] Field of Search .................. 310/95, 94, 103, 105, 310/107, 68 B, 92, 219

[56] References Cited

U.S. PATENT DOCUMENTS

| | | | |
|---|---|---|---|
| 2,616,069 | 10/1952 | Jaeschke | 318/492 |
| 2,657,323 | 10/1953 | Jaeschke | 310/95 |
| 3,028,737 | 4/1962 | Rudisch | 64/30 |
| 3,303,367 | 2/1967 | Jaeschke et al. | 310/95 |
| 3,662,197 | 5/1972 | Worst | 310/78 |
| 4,172,987 | 10/1979 | Massar | 310/178 |
| 4,358,695 | 11/1982 | MacDonald et al. | 310/105 |
| 4,400,638 | 8/1983 | Albrecht et al. | 310/95 |
| 4,410,819 | 10/1983 | Kobayashi et al. | 310/105 |
| 4,446,392 | 5/1984 | Jaeschke | 310/105 |
| 4,526,257 | 7/1985 | Mueller | 192/48.2 |
| 5,337,862 | 8/1999 | Kuwahara | 188/158 |
| 5,363,912 | 11/1994 | Wolcott | 166/72 |

Primary Examiner—Steven L. Stephan
Assistant Examiner—D. R. Haszko
Attorney, Agent, or Firm—Goeffrey A. Mantooth

[57] ABSTRACT

A brushless shaft mounted eddy current drive has a coil mounted to bearings by way of a coil mount. The bearings are located on a hub. The coil mount is anchored to a fixed object. The pole pieces are coupled together by a nonmagnetic material to form a cavity that receives the coil. In another embodiment, a brushless drive has a coil rotatably mounted in a cavity within the pole pieces. A rotary inductive coil is mounted to the pole pieces about a stationary inductive coil. Alternating current is provided to the stationary coil to induce current into the rotary coil. In still another embodiment, an alternator is used to induce current into the rotating coil. In a still further embodiment, a brushless drive incorporates a liquid conductive rotatable coupler in the hub.

17 Claims, 16 Drawing Sheets

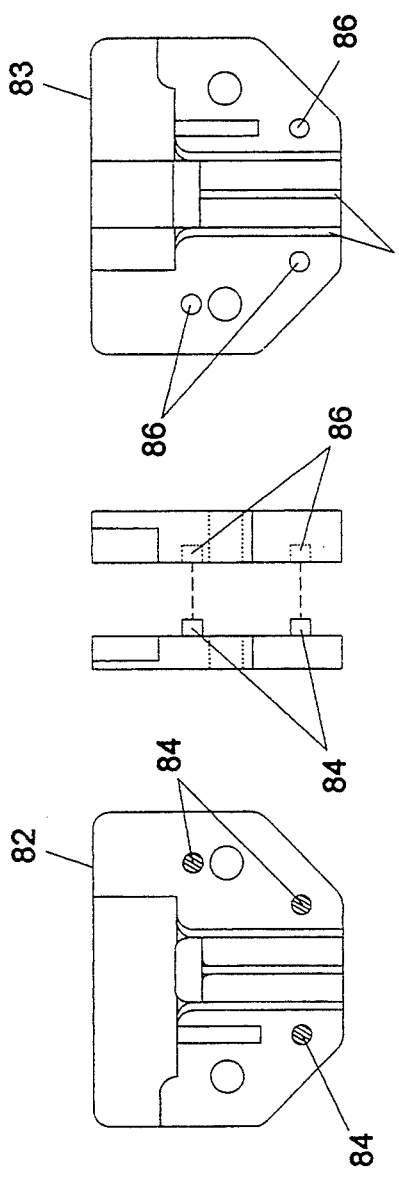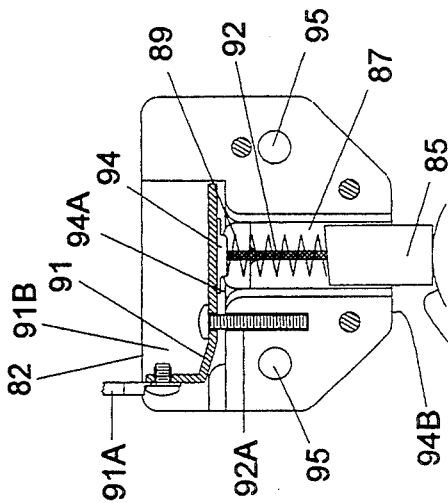

5,446,327

SHAFT MOUNTED EDDY CURRENT DRIVE

SPECIFICATION

This application is a continuation-in-part of pending U.S. application Ser. No. 08/056,132, filed Apr. 30, 1993, which application is a continuation-in-part of pending U.S. application Ser. No. 08/035,981 filed Mar. 18, 1993.

FIELD OF THE INVENTION

The present invention relates to variable speed drives that are mounted onto an output shaft of a motor, such as a fixed speed electric motor, and in particular the present invention relates to eddy current drives.

BACKGROUND OF THE INVENTION

There are many applications where it is desirable to have a fixed speed motor provide a variable speed output. For example, in ventilation systems, an ac synchronous motor is used to rotate an air mover, such as a fan. The energy efficiency of this system increases if the speed of the motor remains fixed while the speed delivered to the fan can be varied.

In the prior art, there are variable speed drives that mount onto the output shaft of the motor. Around the outer circumference of the drive are one or more sheaves. The sheaves receive belts that are coupled to a load. The drive permits a controlled amount of slip. At zero slip, the full rotary power of the motor output shaft is applied to rotate the sheaves. At full slip, the output shaft continues to rotate, but the sheaves remain stationary under a load. Thus, at zero slip, the fully rotary power of the motor is applied to the load, while at full slip, no rotary power is applied to the load.

In Albrecht et al., U.S. Pat. No. 4,400,638, there is disclosed a shaft mounted eddy current drive. The amount of slip is controlled electrically using eddy currents. The output sheaves are mechanically coupled to poles of an electric coil. There are provided opposite, interdigitated poles. An armature provides a magnetic path between the opposite poles. The armature is mechanically coupled to the output shaft of the electric motor. As the motor shaft rotates, the armature also rotates at the same speed as the shaft. In order to rotate the sheaves, current is applied to the coil. This creates an electromagnetic coupling between the poles and the armature, wherein the armature causes the poles and the associated sheaves to rotate.

It is desired to improve upon the prior art drives. The slip rings of the Albrecht et al. drive have the same diameter as, and are located adjacent to, the sheaves. One disadvantage of the slip ring arrangement is the wear on brushes. The chief complaint among customers who buy the prior art drives is brush wear. The brushes must be frequently replaced, adding to the maintenance cost of the drives. The larger the circumference of the slip rings, the shorter the life of the brushes becomes because for each revolution of the motor, the brushes are in frictional contact with a long length of the slip rings.

Another disadvantage of the slip ring arrangement of Albrecht et al. is that as the drive is sized larger or smaller for respective larger or smaller load applications, the circumference of the slip rings change. Thus, the slip rings must be custom made for each size drive. It is desirable to make the slip rings a more uniform size, regardless of the size of the drive, in order to manufacture and repair the drives more efficiently.

Still another disadvantage of the slip ring arrangement of Albrecht et al. is the difficulty in protecting the slip rings and brushes from the environment. If the drive is used outside, it is subjected to moisture, which can reduce the life of the brushes.

A further disadvantage of the slip ring arrangement of Albrecht et al. is that brushes are required to provide current to the rotating coil. As noted above, brushes are subject to wear and must be frequently replaced. It is desirable to provide a means of supplying current to the coil less subject to wear and requiring less maintenance than brushes.

SUMMARY OF THE INVENTION

It is an object of the present invention to provide a shaft mounted eddy current drive that has prolonged brush life.

Another object of the present invention is to provide a drive design that uses the same size slip rings regardless of the power requirements of the drive.

Still another object of the present invention is to provide a drive that protects the slip rings and brushes from the environment.

Still another object of the present invention is to provide a brushless drive.

The drive of the present invention includes a hub that is structured and arranged to be coupled to a motor shaft. The hub has a shoulder, which shoulder is coupled to the hub. An electromagnet is mounted on the hub and abuts against the shoulder. The electromagnet is rotatably coupled to the hub. There is a driven member that is mounted to the hub by bearings. The driven member has a load portion and an armature, with the load portion being structured and arranged to be rotatably coupled to a load and the armature being located adjacent to the electromagnet.

The drive of the present invention has several advantages over prior art drives. One advantage is due to the design of the slip rings. The slip rings are located at the outer end of the drive and are of relatively small diameter. In the preferred embodiment, a slip ring shaft provides a support for mounting the slip rings. The small diameter of the slip rings greatly prolongs brush life by presenting a relatively small circumference that the brushes must traverse for each revolution of the slip rings. Because the brushes contact shorter lengths of slip rings per revolution, the lives of the brushes are prolonged.

Also, by providing the slip rings on a separate slip ring shaft, the size of the slip rings is independent of the sizes of the motor shaft, the sheave and the drive in general. Thus, as the design of the drive is enlarged to provide a drive with more horsepower, or reduced to provide a drive with less horsepower, the size of the slip rings, and thus the brush holders, can remain the same. This uniformity in size of slip rings, which is independent of the size of the drive, reduces manufacturing costs while allowing flexibility in producing a product line of plural drives, each of which is designed for a specific horsepower. Inventory costs are reduced as well, because both manufacturer and user need only stock one size of slip rings and brush holders.

The drive also provides a housing or cover for containing and protecting the slip rings and brushes from the elements. This is important for drives that are used outside, as brush life is extended. The cover prevents moisture from contacting the brushes and the slip rings.

The design of the drive allows for easy partial disassembly while maintaining the connection of the drive to the load and to the motor shaft. The brush holders, slip rings, fan and electromagnet can be removed while leaving the hub connected to the motor shaft and the sheaves coupled to the load. This reduces maintenance time because the drive does not have to be completely removed during disassembly.

The drive is more stable in operation because the sheaves are fully mounted on bearings and are located closer to the end of the hub that couples to the end of the motor. Prior art drives mount the brush holder bracket on the same end of the hub as the sheaves. This causes the sheaves to either be mounted further from the motor (which unfavorably loads the motor shaft and produces vibration) or to be only partially mounted onto a bearing (which produces unbalancing and vibration of the sheaves). The drive of the present invention does not suffer these prior art problems because the sheaves are fully supported by the bearings. In addition, the sheaves, as well as the bulk of the mass of the driver, are located closer to the motor than the prior art drives. This drastically reduces the overhung load on the motor shaft, prolonging motor life.

Another advantage of the drive of the present invention is that the sheaves are fully exposed at all times. In the prior art, the brush holder bracket extends across the sheaves. With the drive of the present invention, the slip rings and brush holder bracket are located on the opposite end of the drive from the sheaves. Thus, the belts can be installed onto and removed from the sheaves without removing the brush holder bracket. In addition, a conduit is used to prevent rotation of the brush holder bracket. The conduit is anchored to the motor and extends through the belts. This arrangement allows the belts to be installed and removed without disassembling any part of the drive.

Still another advantage of the drive is the coupling of the electromagnet to the hub and the fan to the electromagnet. The motor shaft rotates the hub, the electromagnet and the fan continuously at motor speed. This continuous movement of the electromagnet and the fan produces continuous cooling of the electromagnet. Prior art drives locate the electromagnet on the driven member, which may be stationary or operating at a low speed. The electromagnet on prior art drives is not cooled as effectively as with the present invention due to the reduced rotational speed. Effective cooling of the electromagnet prolongs the life of the electromagnet.

A brushless variable speed drive is also provided. The drive has a rotatable member that is structured and arranged to be rotated by a motor. There are pole pieces that have plural interdigitated poles, with the poles being separated from an armature by a gap. One of either of the pole pieces of the armature is fixedly coupled to the rotatable member. The pole pieces have a cavity therein. There is a coil located within the cavity and coupled to a bearing located on the rotatable member. The coil is coupled to the bearing by a coil mount which has a portion that is magnetic located adjacent to the coil.

In another aspect of the present invention, a variable speed brushless drive includes a rotatable member that is structured and arranged to be rotated by a motor, a pole piece assembly having a first pole piece and a second pole piece, each of which has poles that are separated from an armature by a gap, with the first pole piece being coupled to the rotatable member and the second pole piece being coupled to the first pole piece by a retaining member. The retaining member is made of a nonmagnetic material.

In another aspect of the present invention, a variable speed brushless drive is provided. Electrical power is provided to the drive coil so as to produce a magnetic field by the pole pieces, by way of ac inductive coupling. A stationary coil is provided, which coil is connected to a power supply. A rotating coil is provided, which coil is coupled to the pole piece assembly in the drive. A magnetically susceptible path connects the stationary coil and the rotating coil together. The stationary coil is provided with alternating current, wherein alternating current is induced into the rotating coil. The induced alternating current is rectified by a bridge rectifier to direct current. The direct current is provided to the drive coil and the pole pieces.

In still another aspect of the present invention, an alternator type brushless drive is provided. The drive has a rotating coil that is coupled to the drive coil and pole piece assembly. A stationary coil is fixed to a stationary platform. The stationary coil is enclosed in a second set of pole pieces. Direct current is provided to the stationary coil, wherein the second set of pole pieces generate a magnetic field. This magnetic field that is generated by the second set of pole pieces induces an alternating current into the rotating coil. The alternating current is rectified to direct current, which direct current is provided to the drive coil in order to drive the armature.

In still another aspect of the present invention, a liquid conductor coupler is mounted in-line with the axis of rotation of the drive. Direct current is provided to the drive coil through the liquid conductor coupler.

In still another aspect of the present invention, a variable speed drive is provided with a speed sensor coupled to a rotating member of the drive. The drive has a first member with pole pieces and a coil and a second member with an armature. The speed sensor is coupled to one of the first or second members. The other of the first or second members has a periodically changing pattern which is sensible by the speed sensor. A signal transmitter is located on the one member and is connected to the speed sensor. A signal receiver is located on a third member so as to receive a signal produced by the signal transmitter. The third member is stationary with respect to the rotation of the first and second members.

BRIEF DESCRIPTION OF THE DRAWINGS

FIGS. 3 and 5 are side views showing the interiors of the first and second portions, respectively, of a brush holder, in accordance with a preferred embodiment.

FIG. 4 is an end view showing how the first and second portions of the brush holder fit together.

FIG. 6 is a top plan view of the brush holders.

FIG. 7 is a cross-sectional view taken along lines VII—VII of FIG. 6.

FIG. 8 is a side view of the first portion of a brush holder, with a brush installed, and the second portion removed for clarity.

DESCRIPTION OF THE PREFERRED EMBODIMENT

Figure 1:
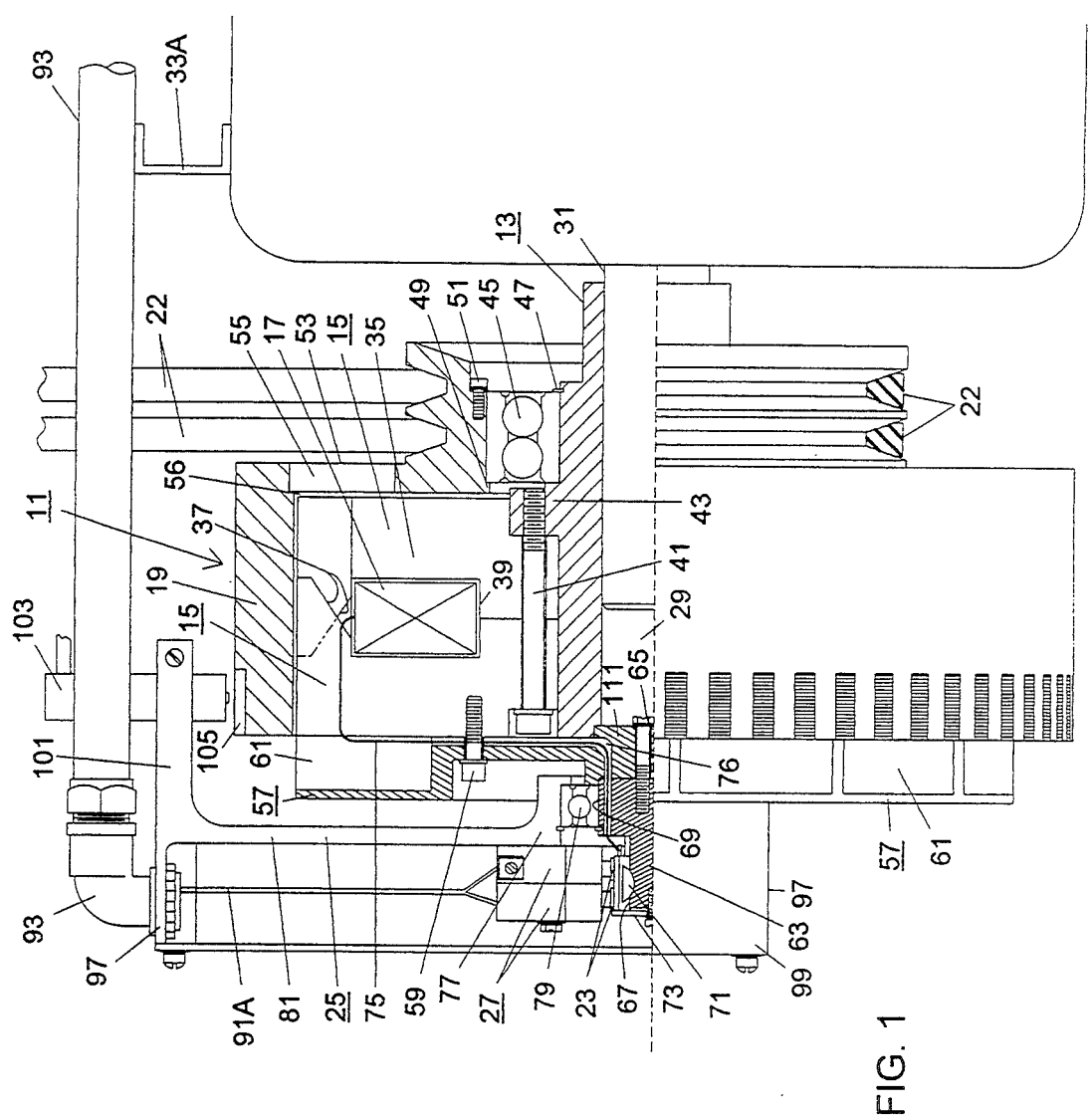
FIG. 1 is a partial cross-sectional side view of the shaft mounted eddy current drive of the present invention, in accordance with a preferred embodiment.

In FIG. 1, there is shown a partial cross-sectional side view of the drive 11 of the present invention, in accordance with a preferred embodiment. The drive 11 has a shaft mounted portion and a load portion. The shaft mounted portion includes a hub 13, pole pieces 15 and a coil 17. The shaft mounted portion mounts onto the shaft of a motor and is rotated directly by the motor shaft. The load portion is rotated by an electromagnetic field developed by the shaft mounted portion. The load portion is coupled to the load (e.g. a fan) and includes an armature 19 and sheaves 21. In addition, the drive includes slip rings 23, a brush holder bracket 25 and brush holders 27.

The shaft mounted portion will now be described. The hub 13 is generally in the form of a sleeve. The hub 13 has a cylindrical cavity 29 located therein for receiving a shaft 31 of a motor 33. The hub 13 is coupled to the shaft 31 by a conventional and commercially available compression type shrink disk (not shown). Alternatively, the cavity 29 may be keyed or threaded to receive respective keys or threads on the motor shaft. The hub 13 has an outer end portion and an inner end portion (with inner being referenced as closer to the motor and outer being referenced as further from the motor 33).

Mounted on the outer end portion of the hub are the pole pieces 15. There are two pole pieces, an inner piece and an outer piece. Each pole piece 15 is made up of an annular portion 35, with poles 37 extending from the outer diameter of the annular portion and a lip 39 extending from the inner diameter of the annular portion. The poles 37 on an individual pole piece are spaced apart by gaps. When the pole pieces are assembled as shown, the poles from the inner and outer pole pieces are interdigitated so as to form alternating polarities around the circumference of the assembly of pole pieces. The assembled pole pieces 15 encircle the coil 17 of wire. Thus, the coil 17 is encircled by the annular portions 35, lips 39 and poles 37 of the pole pieces. The pole pieces and the coil extend around the circumference of the hub. The pole pieces 15, and thus the encircled coils, are secured to the hub 13 by bolts 41. The hub 13 has a circumferential shoulder 43 that extends radially outward to receive the bolts and to position the pole pieces 15. The pole pieces abut against the shoulder 43. The pole pieces are made from a low carbon steel, which is magnetic, so as to provide a path for a magnetic field.

The load portion will now be described. The sheaves 21 are mounted to the hub 13 by way of bearings 45. In the preferred embodiment, the bearing 45 is a double row ball bearing. Alternatively, the bearing may be two bearings. The bearings 45 are located on the hub between the shoulder 43 and a snap ring 47 that is on the hub. The bearings 45 extend around the circumference of the hub. The sheaves 21 are located around the outer circumference of the bearings. The sheaves 21 are positioned on the bearings by a shoulder 49 on one end and bolts 51 on the other end. The sheaves receive belts 22, which are rotatably coupled to a load such as a fan.

The armature 19 is coupled to the sheaves by a radially extending wall 53. The armature 19 is a hollow cylinder and is made of a material that is high in conductivity and permeability. The wall has openings 55 therethrough that communicate with a cavity 56 formed by the armature 19 and the wall 53. The cavity 56 receives the pole pieces 15. The openings 55 allow air circulation through the pole pieces. The sheaves 21, armature 19 and wall 53 form an integral assembly. Alternatively, an interior sleeve can be press fit into the inside diameter of the armature. The interior sleeve can be made of a material that is suitable for the production of eddy currents (high conductivity, high permeability) while the armature around the sleeve can be designed to dissipate heat.

The slip rings 23 are secured to the pole pieces 15 by way of a fan 57. The fan 57 is located so that the pole pieces 15 are interposed between the fan 57 and the sheaves 21. Bolts 59 secure the fan 57 to the outer pole piece 15. The fan has openings 61 therein so that as the pole pieces rotate, the fan causes air to circulate through the openings 55, 61 and the pole pieces for cooling.

A slip ring shaft 63 is coupled to the fan 57 by bolts 65. The slip ring shaft 63 extends in an axial direction away from the sheaves 21. The slip ring shaft has first and second outer surfaces 67, 69. The first outer surface 67 is located at the outer end of the slip ring shaft. The slip rings 23 are mounted on the first surface 67 with a key 71 and an end plate 73. The end plate 73 is bolted onto the outer end of the slip ring shaft. The slip rings 23 extend around the circumference of the slip ring shaft. Wires 75 connect the slip rings 23 to the coil 17. The wires 75 extend through passageways 76 drilled or otherwise formed in the slip ring shaft 63 and the fan 57.

The brush holder bracket 25 has a sleeve portion 77 that is mounted around the second surface 69 of the slip ring shaft 63 by way of a bearing 79. The bearing 79 is secured in place against a shoulder on the fan 57 and snap rings. The bracket 25 has a radial extension portion 81 that extends past the armature 19.

The brush holders 27 are coupled to the radial extension portion 81 of the brush holder bracket 25. Referring to FIGS. 3-8, there are two brush holders 27, one for each brush 85. Each brush holder 27 has a first portion 82 (shown in FIG. 3) and a second portion 83 (shown in FIG. 5). The first portion 82 is provided with pins 84 on its interior surface, while the second portion 83 is provided with holes 86 for receiving the pins 84. The two portions 82, 83 snap fit together with the pins 84 inserted into the holes 86 (see FIG. 4). Each portion has a groove located therein. When the portions are assembled, the groove forms a generally rectangularly shaped cavity 87 for receiving the carbon brushes 85 (see FIGS. 6 and 8). Each side wall of the cavity 87 has a shallow groove 88 that allows the brushes to move inside the cavity.

Each brush 85 is connected to a contact 94 by a flexible wire 92. A spring 89 is interposed between the brush 85 and the contact 94. The contact 94 has edges that bear on a top surface 94A of the assembled brush holder 27. Thus, the brush 85 is prevented from being pulled out from the bottom 94B of the brush holder. A clip 91 overlies the contact 94. The clip is L-shaped to provide a connection point for a wire 91A. The wires 91A connected to the clips are routed to an external power source by a conduit 93. The clip 91 is secured to the brush holder by a screw 92A. The clip is located inside of a recess 91B on the top of the brush holder. This recess 91B locates the clip 91, and the connection point with the wire 91A entirely within the protective confines of the brush holder. The contact 94 makes electrical contact with the clip 91.

Figure 2:
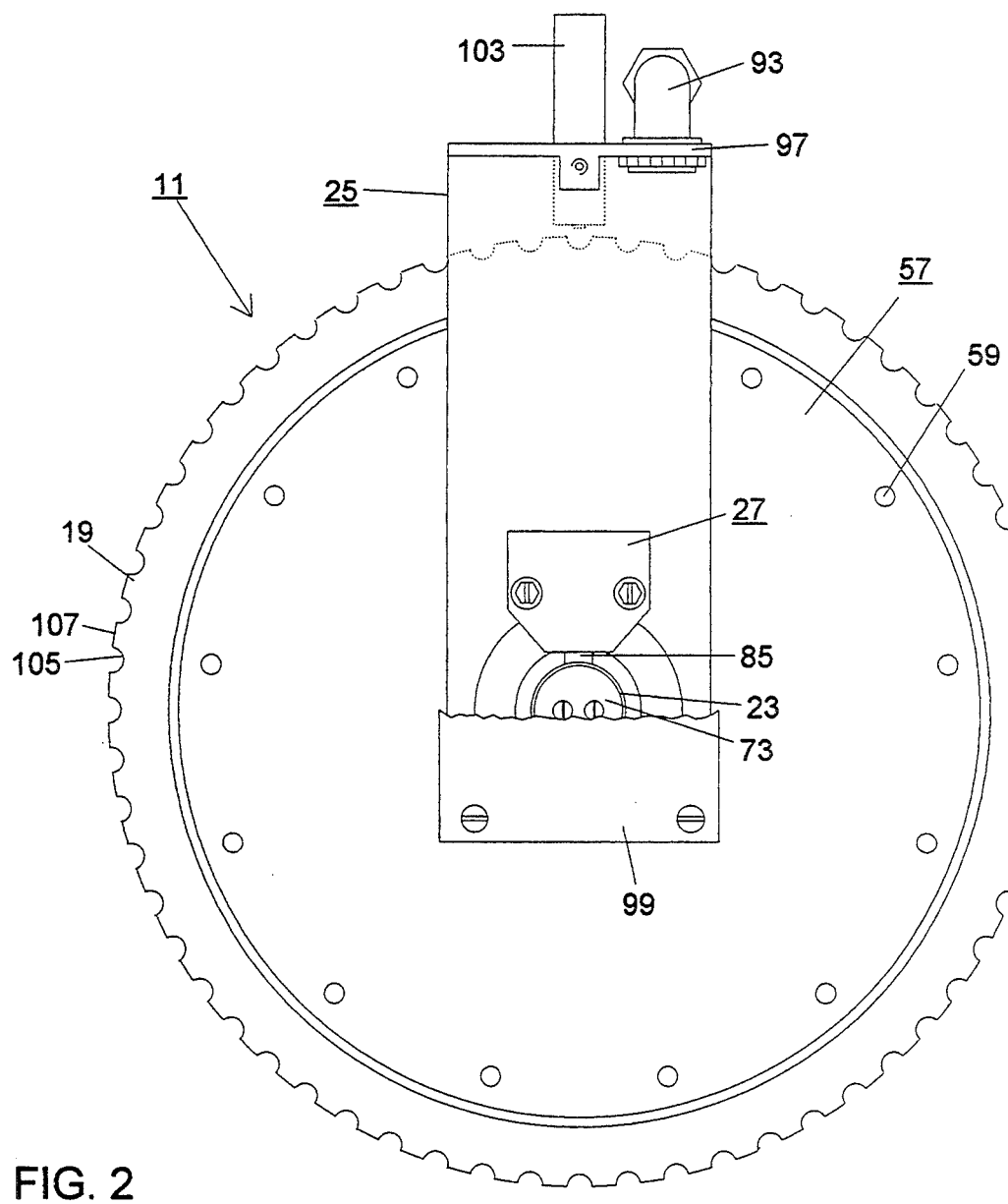
FIG. 2 is a view showing the outer end of the drive, with a housing around the slip rings and brush holder partially cut away.

The two brush holders 27 are oriented with respect to each other as shown in FIG. 6, so that the clips, when installed, face opposite directions. This simplifies the wire connections with the clips. The brush holders are bolted to the brush holder bracket by bolts that are received by holes 95. Referring to FIG. 2, the brush holders 27 are located close to the slip rings 23 so that the brushes 85, which protrude out of the cavities, can contact the slip rings.

The brush holder bracket 25 has end walls 97 that extend in an axial direction. The end walls receive a housing 99 or cover, a portion of which has been broken away in FIGS. 1 and 2 to more clearly illustrate the slip rings and brush holders. The housing 99 and the bracket 25 completely encase the slip rings 23 and the brush holders 27 so as to protect the slip rings and brush holders from the environment and moisture, thereby extending the life of the brushes. Screws are used to couple the housing to the bracket 25. The housing is removable to allow access to the slip rings and brush holders.

The brush holder bracket 25 has an extension 101 (see FIG. 1) that is used to position a speed sensor 103 adjacent to the rotating armature. The outer surface of the armature 19 is scored at regular intervals (see FIG. 2). In the preferred embodiment, the scoring takes the form of grooves 105 which form peaks 107. The sensor 103 is a magnetic pulse pickup. Thus, as the steel armature 19 rotates, every peak 107 is counted. Conventional control circuitry, not shown, is used to monitor the signal produced by the sensor and to control the amount of current supplied to the brush in order to control the speed of the armature rotation.

The drive need not be supplied with a speed sensor. Many applications already have control systems. For example, in HVAC, inputs of temperature and pressure are used to control the speed of the armature rotation.

The assembly of the drive will now be described, referring to FIG. 1. The bearings 45 are installed and secured onto the hub 13. Then, the armature and sheave assembly 19, 21 are installed and secured onto the bearings 45. The pole pieces 15 and coil 17 are assembled together to make up an annular electromagnet. The pole pieces 15 and coil 17 are installed onto the hub 13 with the pole pieces in abutting relationship with the shoulder 43. The pole pieces are then bolted 41 in place. The fan 57 and the slip ring shaft 63 are bolted 65 together. The fan assembly is bolted 59 to the pole pieces. The center 111 of the fan is disk shaped and received by the hub cavity 29 to center the fan with respect to the pole pieces. The support bracket 25 is then mounted, by way of bearings 79, to the slip ring shaft. Then, the brush holders 27 and speed sensor 103 are coupled to the bracket 25.

The drive 11 is then installed onto a motor shaft 31. The motor shaft 31 is inserted into the hub cavity 29 and a compression disk is used to firmly secure the hub to the shaft. The cover 99 is installed onto the bracket 25.

The conduit 93, which contains the wires connected to the brushes, is anchored to a fixed platform, such as the motor 33. A bracket 33A is used to couple the conduit 93 to the motor 33. The wires from the speed sensor 103 are typically tie wrapped to the outside of the conduit 93.

In the preferred embodiment, the conduit 93 is positioned between the sheaves 21 and the load. Thus, when the belts are installed on the sheaves, the conduit 93 extends through the loops formed by the belts; that is the belts 22 extend around both the sheaves 21 and the conduit 93. This arrangement of the conduit 93 through the belts 22, together with the arrangement of the slip rings and the bracket on the outer end of the drive, away from the sheaves, allows the belts to be installed and removed from the sheaves and the load, without disconnecting the conduit and without removing the bracket 25 and the brush holders 27. Thus, the belts can be quickly installed or removed without disturbing the drive, thereby reducing maintenance and down times.

The sheaves 21 are fully supported by the bearings 45, thereby providing long operational life of the sheaves and bearings 45. In addition, the sheaves and the bulk of the mass (the electromagnet) are located close to the motor 33. This arrangement reduces the overhung load on the motor shaft.

The operation of the drive 11 will now be described. The motor 33 is started and the shaft 31 is rotated. As the shaft rotates, it rotates the pole pieces 15 and the coil 17. The sheaves 21 do not rotate, as they are held stationary by the load.

To rotate the sheaves, a selected amount of current is provided to the coil, by way of the brushes and slip rings. This energizes the coil, which causes an electromagnetic field to be developed between adjacent poles. The armature becomes electromagnetically coupled to the pole pieces, wherein the armature and the sheaves are rotated. If the electromagnetic field is weak, then there will be some slip between the armature and the pole pieces. Thus, for every revolution of the pole pieces, the armature will rotate less than one revolution. By controlling the strength of the energizing current to the coil, the amount of slippage and the speed of the armature can be controlled.

The drive 11 may be partially disassembled for maintenance and inspection purposes without uncoupling the drive from the load. Thus, the belts may be retained on the sheaves 21 during partial disassembly. To partially disassemble the drive 11, the bolts 59 are removed, thereby allowing the fan 57, slip ring shaft 63 and bracket 25 to be removed from the pole pieces 15. Then, the bolts 41 are removed, thereby allowing the pole pieces 15 and coil 17 to be removed from the interior cavity 56 of the armature 19. The electromagnet (the pole pieces and the coil) and the slip ring arrangement can be worked on and then reinstalled. During the partial disassembly of the drive, the hub 13 and armature-sheave assembly 19, 21 remain coupled to the motor shaft and to the load. Thus, the design of the drive simplifies maintenance and inspection procedures.

Replacing the brushes 85 is also simple. One method involves removing the clip 91 (see FIG. 8). The contact 94 and brush 85 are then removed and replaced, and the clip 91 is reinstalled. Thus, the brush holders 27 remain coupled to the bracket 25. Another method of changing the brushes involves removing and disassembling the brush holders 27 into their first and second portions 82, 83. This procedure allows the brush holders to be cleaned of carbon dust. After cleaning, the brush holders are reassembled and new brushes are installed.

Replacement of the slip rings 23 is also simplified, requiring only removal of the end plate 73, slipping the slip rings off of the shaft 63 and reinstalling a new pair. Replacement of the brushes and slip rings can be performed while leaving the drive intact on the motor shaft 31.

Figure 9:
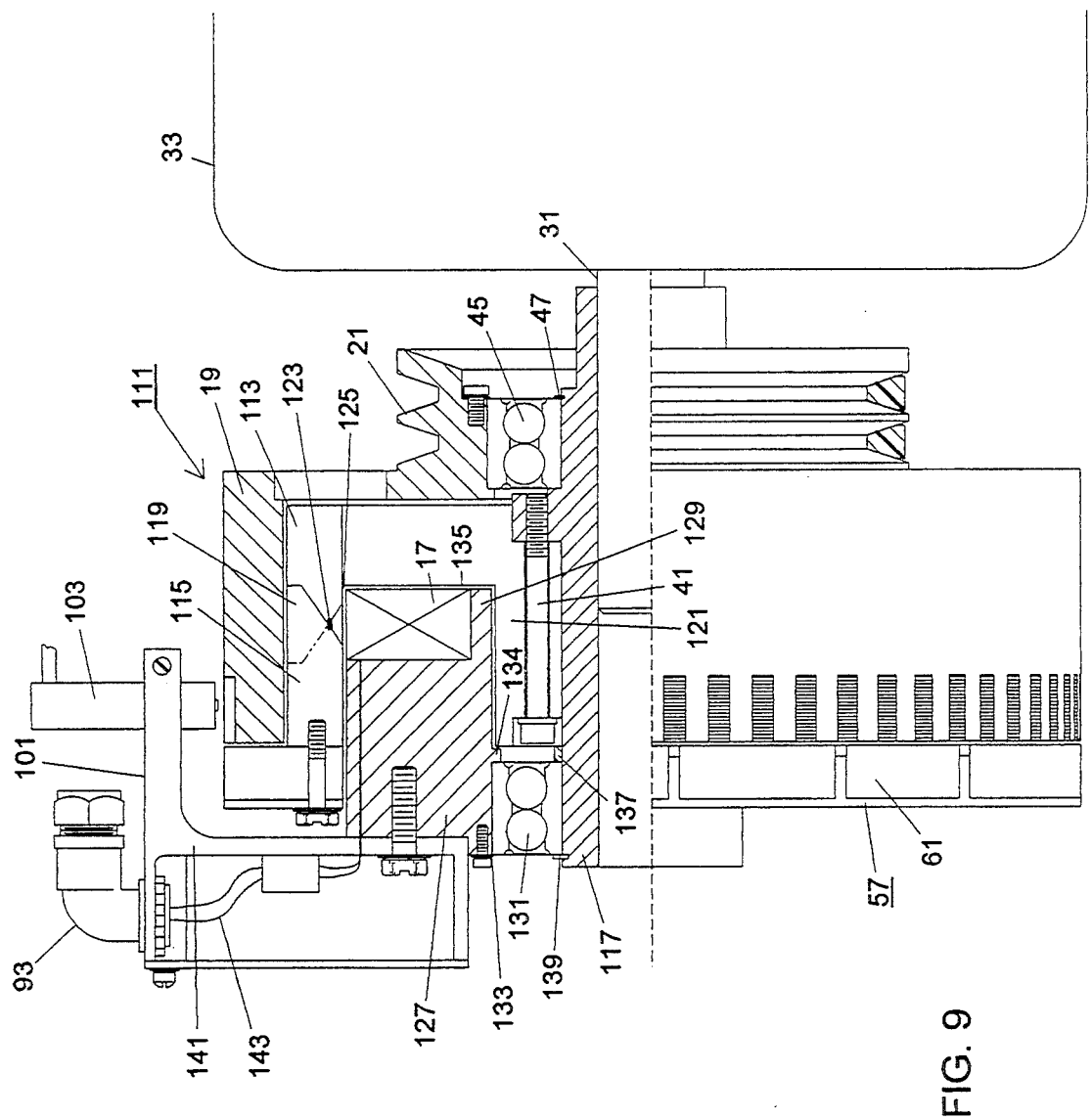
FIG. 9 is a partial cross-sectional side view of the drive of the present invention, in accordance with another embodiment showing a brushless design.
Figure 10:
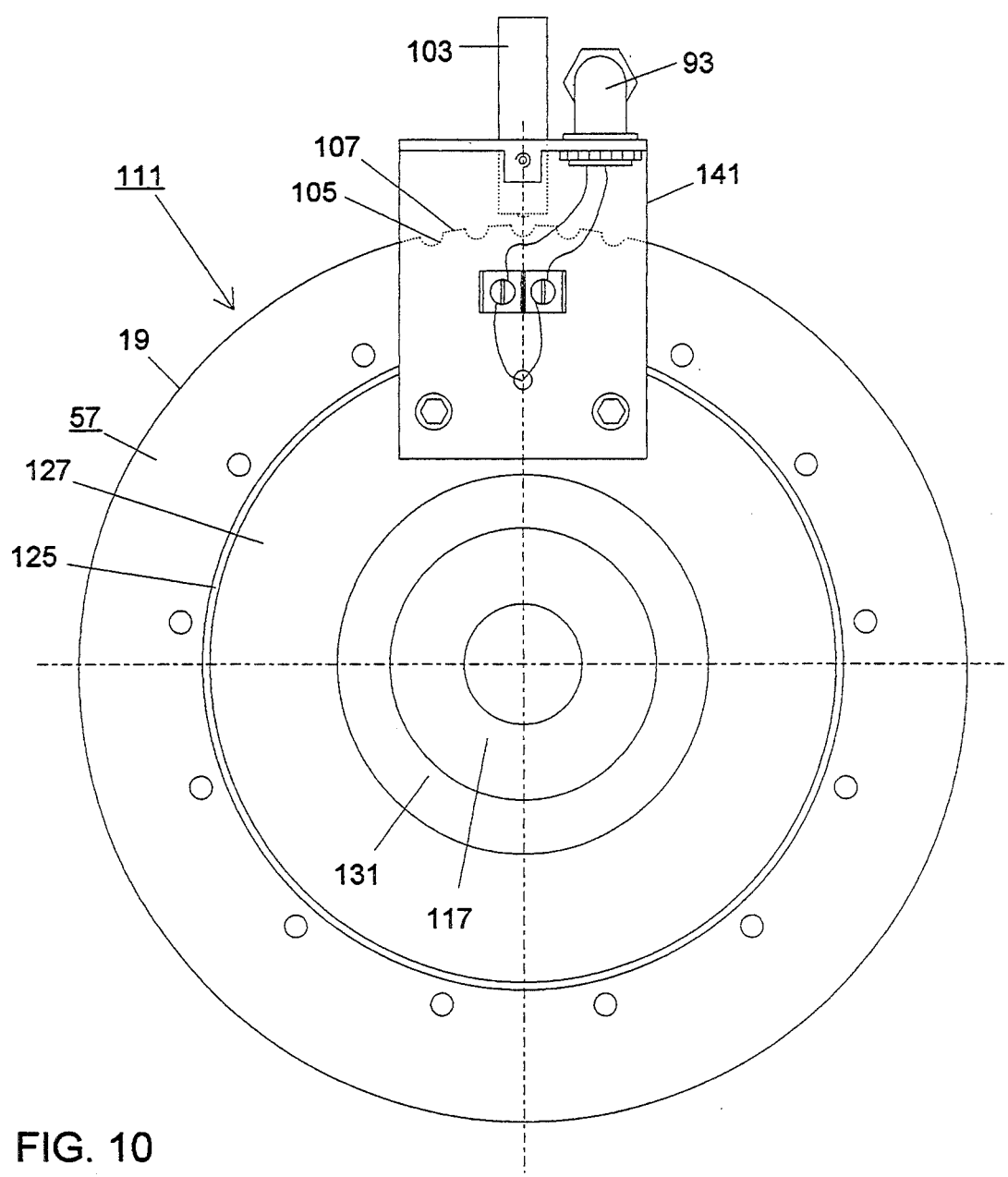
FIG. 10 is a view showing the outer end of the drive of FIG. 9.

In FIGS. 9 and 10, there is shown the drive 111 of the present invention, in accordance with another embodiment. Like numbers in the figures designate similar parts and components. The embodiment of FIGS. 9 and 10 is referred to as a brushless drive, because brushes are not used. Instead, the coil 17 is held in a non-rotating manner relative to the pole pieces 113, 115 and the armature 119. Because the coil 17 is fixed, no slip rings or brushes are required to provide electric current to the coil. Instead, the coil is wired directly to a source of electric power (or to a control circuit regulating the amount of power supplied to the coil).

The hub 117 of the drive 111 has an outer end portion that extends out beyond the pole pieces 113, 115.

The pole pieces have two components, namely an inner pole piece 113 and an outer pole piece 115. The inner pole piece 113 is, referring to the orientation of FIG. 9, shaped like a backwards "C". It has individual poles 119 which are interdigitated with the poles on the outer pole piece 115. The inner pole piece 113 has a mounting portion 121 that contacts the hub 117. The mounting portion is secured to the hub by the bolts 41. The outer pole piece 115 is a single piece having an annular portion 122 and plural poles 119 extending from the annular portion.

The outer pole piece 115 is coupled to the inner pole piece 113 by a retaining ring 123 that is nonmagnetic and low in magnetic permeability. Thus, the retaining ring 123 does not detract from the magnetic field coupling between the poles and the armature. For example, the ring 123 could be copper or stainless steel. Furthermore, the retaining ring 123 is located along the inside diameter of the poles 119 so as to not interfere with the magnetic field between the poles and the armature. The inner circumference of each pole 119 is chamfered so as to form a point at the end of each pole. This chamfering forms an upside down "V" cavity as shown in FIG. 1. In the preferred embodiment, the retaining ring 123 is located within this cavity. The retaining ring 123 is secured to the pole pieces 113, 115, such as by welding, so as to make a single pole piece assembly. The fan 57 is bolted to the annular portion of the outer pole piece 115.

Together, the pole piece assembly forms a cavity 125. The coil 17 is located within the pole piece assembly cavity 125. The annular coil 17 is supported within the annular cavity 125 by a coil mount 127. The coil mount 127 has a lip 129 for supporting the coil. The coil can be secured to the coil mount by a suitable adhesive. The coil mount 127 is supported on the hub 117 by bearings 131. The coil mount 127 thus extends from a position outside of the pole pieces to a location inside of the pole piece cavity 125. A snap ring 133 and a step 134 are used to retain the coil mount 127 to the bearings 131. The coil 17 and the coil mount 127 are separated from the pole pieces 113, 115 by a gap 135. The coil 17 remains stationary while the pole pieces 113, 115 rotate relative to the coil. The coil mount 127 is made of the same material as the pole pieces 113, 115, so as to provide a path for a magnetic field about the coil.

The bearings 131 are located on the outer end of the hub 117. The bearings 131 supporting the coil mount 127 are set off from the inner pole piece 113 by a spacer ring 137. A snap ring 139 retains the bearings 131 on the hub 117.

A bracket 141 is bolted onto the coil mount 127. The bracket 141 is shaped like an upside down "L" (referring to the orientation of FIG. 9). The speed sensor 103 is mounted to the extension portion 101 of the bracket 141. The outside diameter of the armature 19 has grooves 105 and peaks 107 to form teeth (see FIG. 10), which teeth are detected by the speed sensor during the rotation of the armature. The teeth extend around the entire circumference of the armature. (In FIG. 10, only a few teeth are shown.) A conduit 93 is coupled to the bracket. The conduit 93 contains the wires 143 for energizing the coil with current. The conduit 93 is anchored to a fixed platform, such as the motor. This anchoring prevents rotation of the coil 17 and the speed sensor.

In operation, the hub 117 rotates the pole pieces 113, 115 at the same speed as the motor shaft 31. The coil 17 does not rotate, as it is held stationary by the anchored or fixed bracket. Because the coil does not rotate, no brushes are required to provide current to the coil.

When no current is applied to the coil, there is no magnetic coupling between the pole pieces and the armature. Therefore, under a load, the sheaves 21 and the armature 19 do not rotate. Application of current to the coil provides magnetic coupling between the pole pieces and the armature, causing the armature and the sheaves to rotate. The coil remains stationary irregardless of the rotation of the pole pieces or the armature.

Because the drive 111 of FIGS. 9 and 10 does not use brushes, less maintenance is required than with drives that do require brushes.

The brushless drive 111 of FIGS. 9 and 10 can easily be assembled and disassembled in the field. This is a desirable characteristic, particularly if a drive picks up dirt or debris and must be cleaned. To disassemble the drive, the snap ring 139 is removed from the hub 117. Then, the bearing 131, the coil mount 127 and the coil 17 are removed from the hub and the pole pieces. The pole piece assembly can be removed by unscrewing the bolts 41. The armature can be removed by removing the snap ring 47. To reassemble the drive, the armature 19 and its bearing are reinstalled into the hub. The pole pieces 113, 115 are bolted in place onto the hub. Then, the coil mount 127 is coupled to the bearing 131. The bearing 131 is installed onto the hub 117 and the coil 17 is located within the cavity 125.

Although the coil mount 127 has been described as a single piece, it may be made of plural pieces. Because the portion of the coil mount outside of the pole piece cavity 125 does not contribute to the magnetic field path around the coil, there is no need for this portion of the coil mount to be magnetic. For example, the coil mount could be made of a magnetic inner piece and a nonmagnetic outer piece. The magnetic inner piece would be located between the outer pole piece 115 and the mounting portion 121 of the inner pole piece 113 and would be adjacent to the coil. This inner piece would maintain a magnetic path around the coil 17. The nonmagnetic outer piece would couple the magnetic inner piece and the coil to the bearing 131. The inner and outer pieces could be joined together by bolts.

Figure 11:
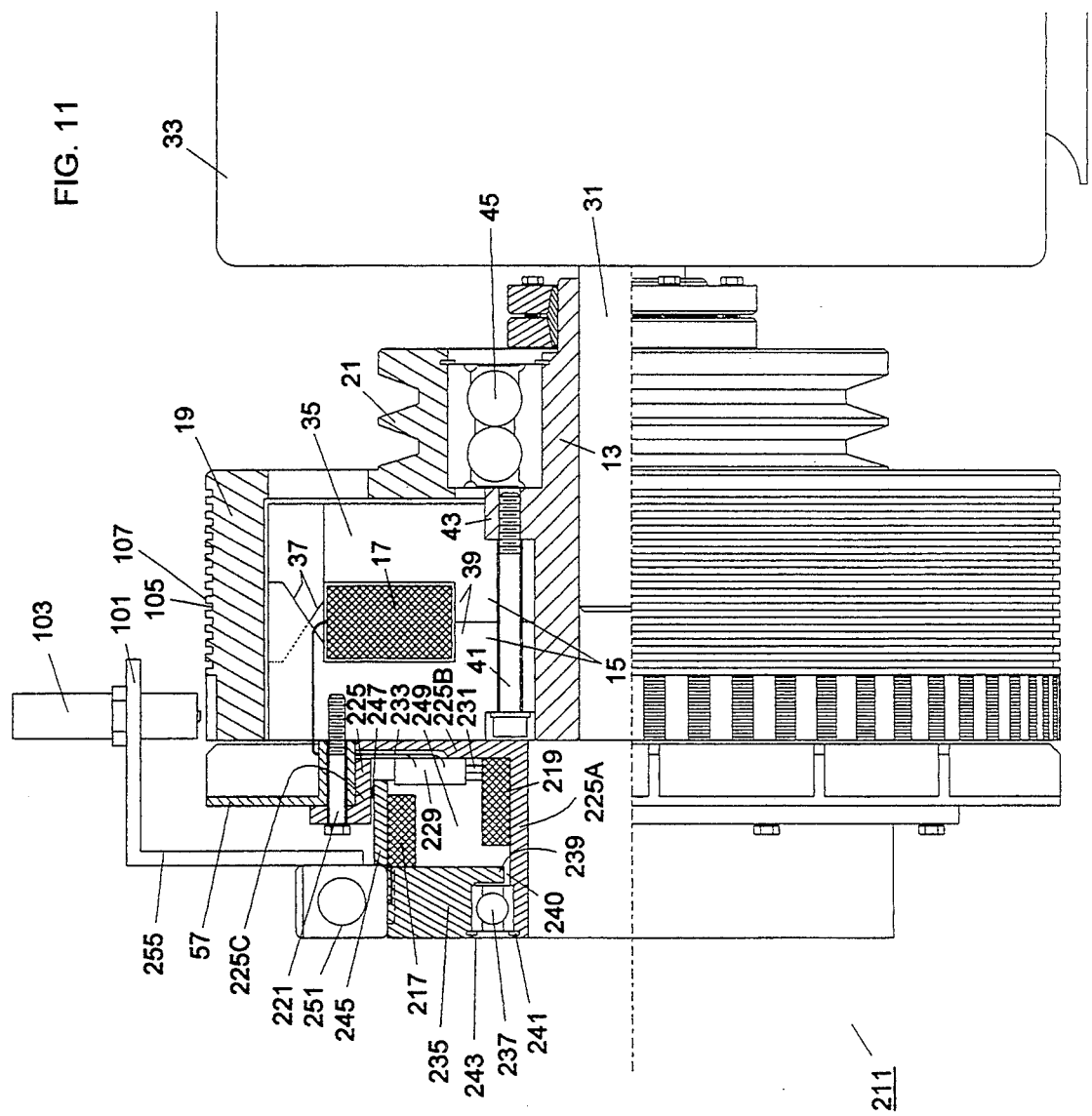
FIG. 11 is a partial cross-sectional side view of the drive of the present invention, in accordance with a further embodiment showing an ac inductive rotative power coupling for providing current to the rotating coil.
Figure 12:
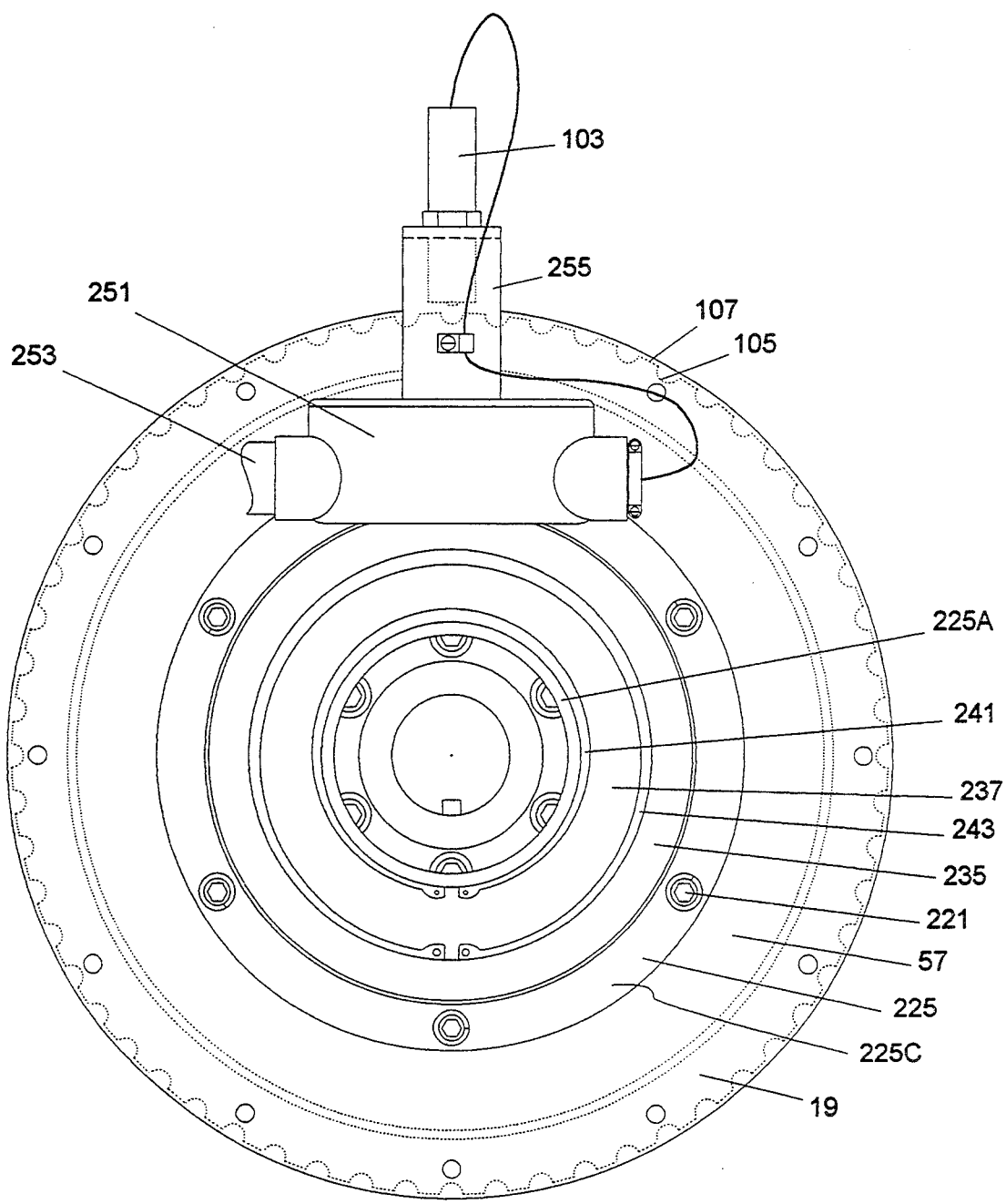
FIG. 12 is a view showing the outer end of the drive of FIG. 11.

In FIGS. 11 and 12 there is shown a drive 211 of the present invention, in accordance with a further embodiment. The drive 211 incorporates an ac inductive rotative power coupling instead of brushes in order to provide electrical current to the rotating coil 17. Like numbers in the figures designate similar parts and components.

The embodiment of FIGS. 11 and 12 is a brushless drive in which the pole pieces 15 and the drive coil 17 rotate relative to the armature 19. (In the embodiments of FIGS. 11–13, the coil 17 will be referred to as a drive coil to distinguish it from the power coupling coils.) The drive 211 of FIG. 11 combines the relatively continuous pole pieces 15 of the drive 11 of FIG. 1 with a brushless design. Use of a relatively continuous pole pieces minimizes gaps in the pole pieces which reduce the overall efficiency of the drive.

In order to connect the rotating coil 17 to a source of electric power or a control circuit regulating the amount of power supplied to the coil 17, a pair of inductively coupled coils 217 and 219 are used. One coil 217 is mounted stationary relative to the rotating coil 17 and the pole pieces 15. The electrical power source or control circuit is wired directly to the stationary coil 217. The second coil 219 is rotatably mounted adjacent to the stationary coil 217 and rotates in unison with the coil 17 and the pole pieces 15. The rotating coil 219 is wired via the bridge rectifier to the coil 17. Current applied to the stationary coil 217 by the power source induces a current in the rotating coil 219 which is supplied to the coil 17.

The structure of the ac inductive rotative power coupling drive 211 will now be described. The structure of the load portion of the drive 211 including the sheaves 21, the bearings 45 and the armature 19 is identical to the load portion of the drive 11 which is described above.

The rotating coil 219 is coupled to an inner section 225 which in turn is coupled to the fan 57 with bolts 221. A first portion 225A of the inner section extends outward from the pole pieces 15 and has an inside diameter slightly larger than the outside diameter of the hub 13. The first portion 225A is a hollow tube. Adjacent the pole pieces 15, a second portion 225B of the inner section extends radially outward from the first portion 225A to the fan 57. The rotating coil 219 is coupled to the first portion 225A of the inner section so as to abut the second portion 225B. The coil 219, which is annular in shape, can be coupled to the first portion 225A by adhesive bonding. The inner section also has a third portion 225C, which is "L" shaped in cross-section. The third portion extends from the outer circumferential end of the second portion 225B in a direction that is parallel to the first portion 225A. Thus, the third portion 225C also forms a hollow tube. The inner portion 225 is bolted to the fan by bolts 221, which extend through the third portion 225C.

A bridge rectifier 229 is coupled (by adhesive bonding) to the second portion 225B of the inner section adjacent to the rotating coil 219. The bridge rectifier 229 is electrically connected between the rotating coil 219 and the coil 17. The bridge rectifier 229 provides direct current to the coil 17 from an alternating current induced in the rotating coil 219 by an ac electrical power source. The bridge rectifier is electrically connected to the rotating coil 219 with wires 231. Wires 233 extend through the fan 57 and electrically connect the bridge rectifier 229 and the coil 17.

The stationary coil 217 is mounted to and supported by a coil mount 235 which remains stationary relative to the coil 17 and the rotating coil 219. The coil mount 235 is supported on the first portion 225A of the inner section by bearings 237 located about the outside diameter of the first portion 225A. The bearings 237 are held in place on the first portion 225A by a shoulder 239 of the coil mount 235, a shoulder of the first portion 225A, and snap rings 241 and 243. The shoulder 239 is separated from the first portion 225A by a gap 240.

The coil mount 235 extends radially outward from the bearings 237. The coil mount 235 forms a lip 245 at the outer radial edge of the coil mount 235. The lip 245 extends towards the pole pieces 15 adjacent to an inside diameter of the third portion 225C. The lip 245 is separated from the third portion 225C by a gap 247. The stationary coil 217 is secured with a suitable adhesive to the inside diameter of the lip 245 of the coil mount 235 facing the rotating coil 219.

The coil mount 235, lip 245, and first and second portions 225A and 225B of the inner section 225 form a cavity 249 across which the coils 217 and 219 are opposed. The coil mount 235 and the inner section are formed of magnetic susceptible materials in order to maintain a magnetic path about the coils 217 and 219. The coil mount 235 and the inner section 225 can be formed of iron, magnetically susceptible low carbon steel, amorphous silicon steel, or powdered ferrite core material.

A junction box 251 is secured to a flattened portion of the outside diameter of the coil mount 235. Referring to FIG. 12, a conduit 253 couples the junction box 251 to a fixed platform (such as the motor 33 or the ground), in order to prevent rotation of the coil mount 235. Similar coupling to prevent rotation is shown in FIG. 1. Wires extend from the junction box 251 through the coil mount 235 to the stationary coil 217 to electrically connect the stationary coil 217 to the power source. The junction box 251 is fastened to the coil mount 235 with screws (not shown).

A bracket 255 is coupled to the conduit 251. The bracket 255 is shaped like an upside down "L" (referring to the orientation as shown in FIG. 11). The bracket 255 is oriented to extend over the armature 19. The speed sensor 103 is mounted to an extension portion 101 of the bracket 255 in a position to detect movement of the teeth formed by the grooves 105 and peaks 107 of the armature 19 (see FIG. 12).

In operation, the hub 13 rotates the pole pieces 15 at the same speed as the motor shaft 31. The coil 17 is rotated with the pole pieces 15.

In order to provide electrical current to the coil 17, alternating current is applied to the stationary coil 217. The alternating current may be varied, for example, between a potential of 0 to 120 volts, and may be various wave types including sinusodial, square wave, and triangular. In addition, the alternating current need not be at 60 Hz, but can be other frequencies.

When no current is applied to the stationary coil 217 there is no current induced in the rotating coil 219 and thus no current is provided to the coil 17. Therefore, there is no magnetic coupling between the pole pieces 15 and the armature 19. Under a load the sheaves 21 and the armature 19 do not rotate if there is no magnetic coupling between the armature 19 and the pole pieces 15.

When alternating current is applied to the stationary coil 217, current is induced in the rotating coil 219 through the coil mount 235 and the inner piece 225. A magnetic path is formed between the coils 217, 219 by way of (going in a counterclockwise direction in FIG. 11) the coil mount 235, the shoulder 239, the gap 240, the first portion 225A, the second portion 225B, the third portion 225C, the gap 247 and the lip 245. The bridge rectifier 229 transforms alternating current supplied by the rotary coil 219 to direct current which is supplied to the coil 17. The current in the coil 17 causes the pole pieces 15 and the armature 19 to become magnetically coupled, thereby rotating the armature 19 and the sheaves 21. Increasing the voltage (or power) to the stationary coil 217 increases the magnetic coupling between the pole pieces 15 and the armature 19, thereby increasing the rate of rotation of the armature 19.

Because the drive 211 of FIGS. 11 and 12 does not use brushes, less maintenance is required than with drives that do use brushes. Furthermore, because no gap is required between the coil 17 and the pole pieces 15 the drive 211 is more efficient than drives which require a gap between the coil and pole pieces.

Figure 13:
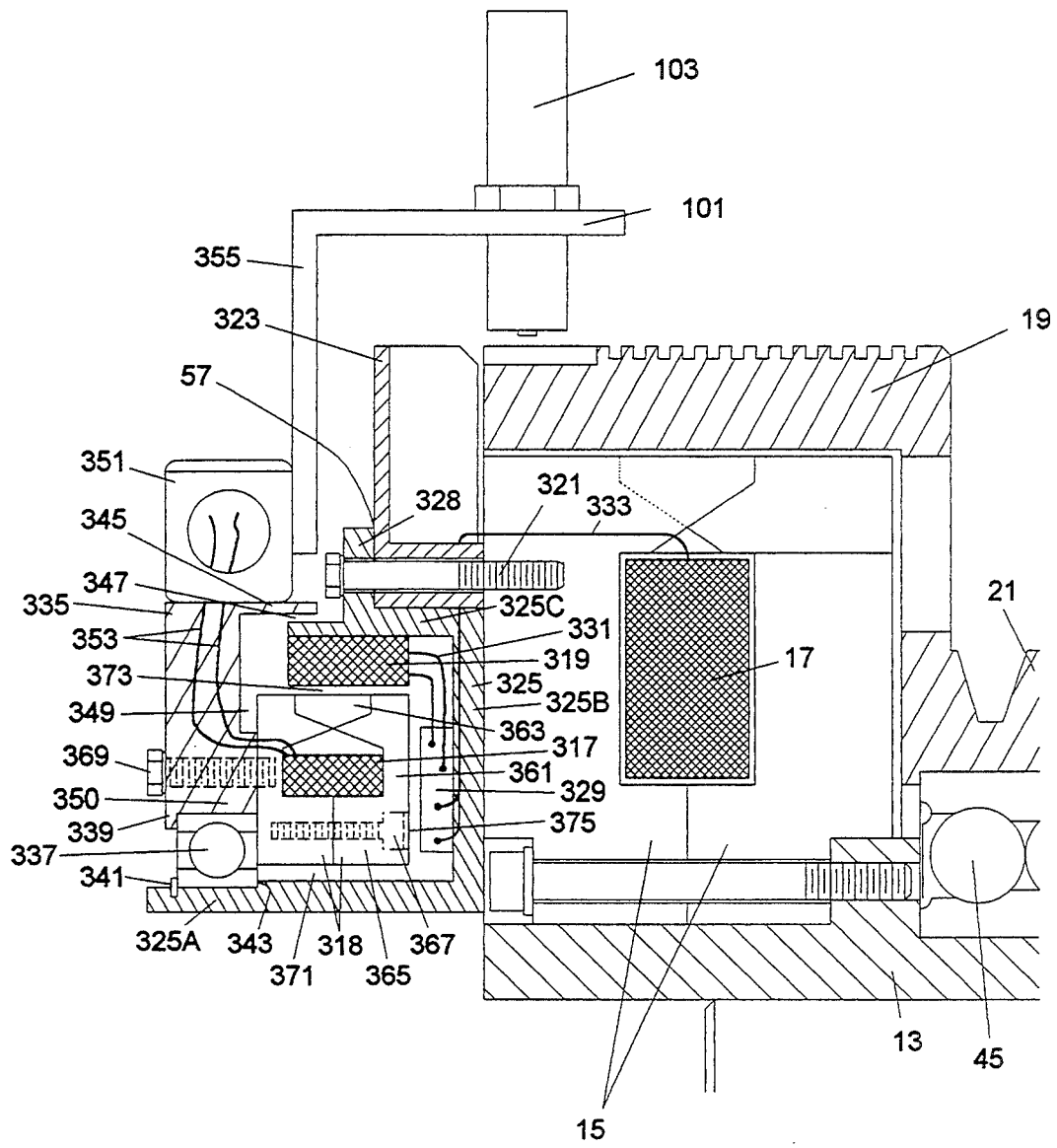
FIG. 13 is a partial cross-sectional side close up view of the drive of the present invention, in accordance with a still further embodiment showing an alternator power coupling for providing current to the rotating coil.

In FIG. 13 there is shown a drive 311 of the present invention, in accordance with a still further embodiment. The drive 311 is also a brushless drive. An alternator rotative power coupling is used to provide electrical current to the coil 17. Again, like numbers in the figures designate similar parts and components.

The embodiment of FIG. 13 is a brushless drive 311 in which the coil 17 rotates relative to the armature 19 along with the pole pieces 15. The drive 311 operates from a direct current power source and provides direct current to the coil 17 in order to magnetically couple the pole pieces 15 and the armature 19.

The alternator rotative power coupling includes a stationary coil 317, stationary pole pieces 318, a rotating coil 319 and a bridge rectifier 329. The alternator rotative power coupling provides current to the coil 17 in response to power supplied from the direct current power source. The power source is electrically connected to the stationary coil 317 which is located within the stationary pole pieces 318. The rotating coil 319 is located to rotate about the stationary pole pieces 318 and the stationary coil 317. Application of current from the power source through the stationary coil 317 causes a magnetic field to be generated about the stationary pole pieces 318. Rotation of the rotating coil 319 through the magnetic field about the stationary pole pieces 318 induces an alternating current in the rotating coil 319. The rotating coil 319 is electrically connected to the bridge rectifier 329 which converts the alternating current to direct current. The direct current from the bridge rectifier is then supplied to the coil 17. The electrically energized coil 17 induces magnetic coupling between the rotating pole pieces 15 and the armature 19 causing the armature 19 to rotate and drive a load.

The structure of the alternator rotative power coupling drive 311 as shown in FIG. 13 will now be described. The structure of the load portion of the drive 311 including the sheaves 21, bearings 45, and armature 19 is identical to the load portion of the drive 11 which is described above with reference to FIG. 1. The structure of the hub 13, pole pieces 15, and coil 17 of the drive 311 is also identical to the structure of the hub 13, pole pieces 15 and coil 17 of the drive 11 and is also identical to the hub 13, pole pieces 15 and coil 17 of the drive 211, both of which are described above.

The annular rotating coil 319 is coupled to an inner section 325 which is bolted to the fan 57 and the pole pieces 15 with bolts 321. The inner section 325 has a first portion 325A, a second portion 325B, and a third portion 325C. The first portion 325A of the inner section extends outwards from the pole pieces 15 and has an inside diameter slightly larger than the outside diameter of the hub 13. The first portion 325A forms a hollow tube. The second portion 325B of the inner section extends radially outward from the first portion 325A adjacent the pole pieces 15 to the fan 57. The third portion 325C extends from the outer radial edge of the second portion 325B in a direction that is parallel to the first portion 325A. Thus, the third portion 325C also forms a hollow tube. The rotating coil 319 is adhesively bonded to the inside diameter of the third portion 325C and extends around the entire inside diameter of the third portion 325C. Bolts 321 extend through a shoulder 328 of the inner section 325 to join the inner section 325 to the pole pieces 15.

The rotating coil 319 can be a single phase coil or a three phase coil.

Figure 23:
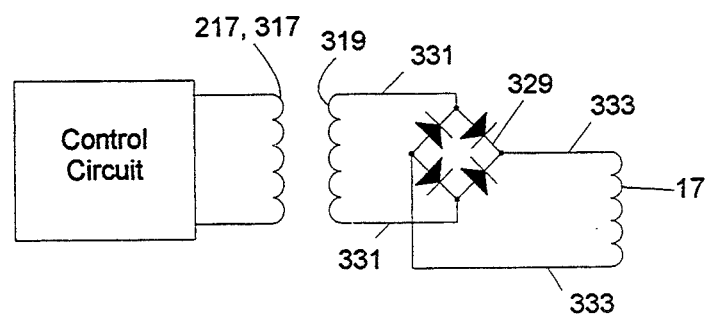
FIG. 23 is an electrical schematic of a bridge rectifier used in conjunction with the drives of FIGS. 11 and 13.

The bridge rectifier 329 is adhered to the outer face of the second portion 325B. Referring to FIG. 23, the bridge rectifier 329 is electrically connected between the rotating coil 319 and the coil 17. Wires 331 electrically connect the bridge rectifier 329 with the rotating coil 319, and wires 333 extend through the fan 57 and the pole pieces 15 to electrically connect the bridge rectifier 329 and the coil 17. The bridge rectifier 229 (of FIG. 11) and its connections to the coils is the same as the bridge rectifier 329 shown in FIG. 23.

The stationary pole pieces 318 are mounted to and supported by a coil mount 335 which remains stationary relative to the coil 17, pole pieces 15, and the rotating coil 319. The coil mount 335 is supported on the first portion 325A by bearings 337 located about the outside diameter of the first portion 325A. The bearings 337 are held in place by a shoulder 339 of the coil mount 335 and a snap ring 341 on one side, and by a shoulder 343 of the first portion 325A and the stationary pole pieces 318 on the other side.

The coil mount 335 extends radially outward from the bearings 337. At the outer radial edge of the coil mount 335 is a lip 345. The lip 345 extends towards the pole pieces 15 and provides a surface for mounting a junction box 351. The coil mount 335 and the inner section 325 of the fan 57 form a cavity 349 in which the rotating coil 319, stationary pole pieces 318, and the stationary coil 317 are located.

The stationary pole pieces 318 are located in the cavity 349 and are mounted to a shoulder 350 of the coil mount 335. There are two stationary pole pieces 318, an inner piece and an outer piece. Each stationary pole piece 318 is made up of an annular portion 361 with poles 363 extending from the outer diameter of the annular portion 361, and a lip 365 extending from the inner diameter of the annular portion 361. The poles 363 on an individual stationary pole piece 318 are spaced apart by gaps. When the stationary pole pieces 318 are assembled as shown, the poles 363 of the inner and outer stationary pole pieces 318 are interdigitated so as to form alternating magnetic polarities around the circumference of the assembly of the stationary pole pieces 318.

The assembled stationary pole pieces 318 encircle the stationary annular coil 317. The stationary coil 317 is located between and is encircled by the annular portions 361, the poles 363, and the lips 365 of the stationary pole pieces 318. The inner and outer stationary pole pieces 318 are bolted together about the stationary coil 317 with bolts 367. The assembled stationary pole pieces 318 encompassing the stationary coil 317 are mounted to the shoulder 350 of the coil mount 335 with bolts 369. The mounted stationary pole pieces 318 and stationary coil 317 extend around the circumference of the first portion 325A and are separated therefrom by a gap 371. The inner stationary pole pieces 318 are separated from the bridge rectifier 329 by gap 375. These gaps 371, 375 are provided so that the pole pieces 318 remain stationary without interfering with the rotating first portion 325A and bridge rectifier 329.

The poles 363 of the stationary pole pieces 318 are separated from the rotating coil 319 by a gap 373.

Current is supplied to the stationary coil 317 from an electrical power source through wires 353. The wires 353 extend from the stationary coil 317 through the stationary pole pieces 318 and the coil mount 335 to a junction box 351. A conduit is used to couple the junction box 351 and the coil mount 335 to a fixed or stationary platform, such as the motor. Thus, the pole pieces 318 and coil 317 are stationary, while the coil 319, the pole pieces 15 and the coil 17 are rotating at motor speed. The junction box 351 is anchored to the coil mount 335 with screws (not shown).

A bracket 355 is coupled to the conduit 351. The bracket 355 is oriented to extend over the armature 19. The speed sensor 103 is mounted to an extension portion 101 of the bracket 355 to detect movement of the armature 19.

In operation, dc current is provided to the stationary coil 317 in order to energize the coil 17. As dc current is provided to the stationary coil 317, a magnetic field is created between the poles 363. This magnetic field extends across the gap 373 to the rotating coil 319, wherein alternating current is induced into the rotating coil. The induced current is converted to dc by the bridge rectifier 329, which dc current is then used to energize the coil 17.

To vary the amount of current supplied to the coil 17 and thus the coupling of the armature 19 to the pole pieces 15, the voltage and/or current provided to the stationary coil 317 is varied. When little or no current is supplied to the stationary coil 317, the coil 17 is not sufficiently energized and little or no coupling occurs between the armature 19 and the pole pieces 15. Thus, the armature 19 does not rotate. As more current is applied to the stationary coil 317, more current is induced into the rotating coil 319 and more current is provided to the coil 17 in order to rotate the armature.

The alternator rotative coupling drive 311 of FIG. 13 is brushless and therefore requires less maintenance than drives that use brushes. The drive 311 also is more efficient than drives requiring a gap between the coil and the pole pieces since no gap is required between the coil and pole pieces of drive 311.

Figure 14:
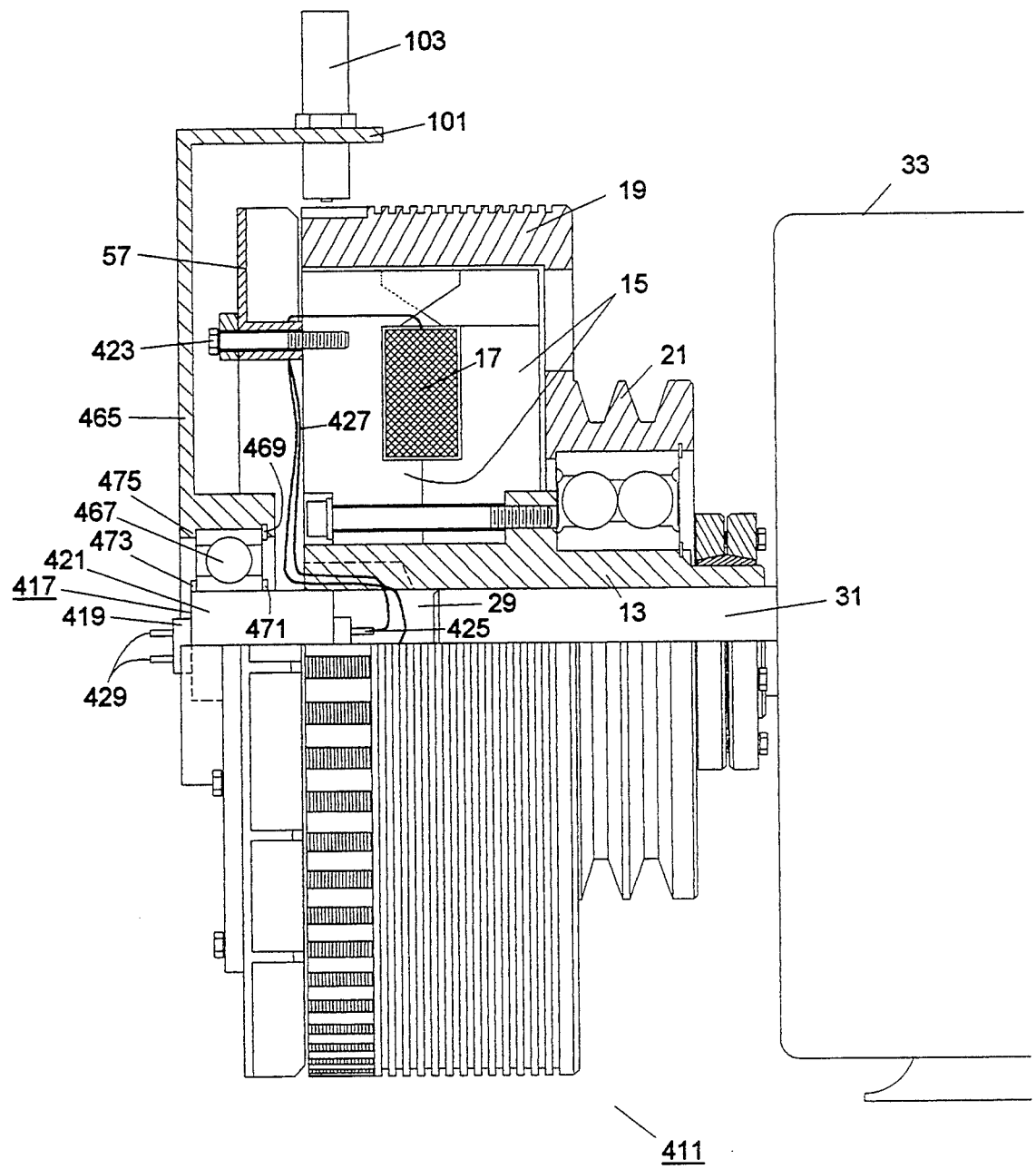
FIG. 14 is a partial cross-sectional side view of the drive of the present invention, in accordance with a still further embodiment showing a liquid filled rotary coupler for providing current to the rotating coil.

In FIG. 14 there is shown a drive 411 of the present invention, in accordance with a still further embodiment. The drive 411 utilizes a liquid conductor rotative coupler 417 to supply current to the coil 17. Again, like numbers in the figures designate similar parts and components. The embodiment of FIG. 14 is a brushless drive in which the coil 17 rotates relative to the armature 19 along with the pole pieces 415. The drive 411 operates from a direct current power source and provides direct current to the coil 17. The coil 17 is encompassed by the pole pieces 415 so that no gap separates the coil 17 and pole pieces 415 thereby providing efficient magnetic coupling between the coil 17 and the pole pieces 415 when the coil 17 is electrically charged.

A mercury coupler 417 electrically connects the coil 17 and the power source so that current may be supplied to the coil 17 from the power source through the mercury coupler 417. The mercury coupler 417 has an inner housing 419 and an outer housing 421. The inner and outer housings 419 and 421 are rotatable with respect to each other. Electrical contacts couple the inner and outer housing 419 and 421 so that electrical power may be transmitted between the inner and outer housings 419 and 421. The electrical power source is electrically connected to the inner housing 419 and the coil 17 is electrically connected to the outer housing 421. The inner housing 419 remains stationary relative to the coil 17 while the outer housing 421 rotates with the coil 17. Current is transmitted from the power source through the inner housing 419 to the outer housing 421 and from the outer housing 421 to the coil 17. The current in the coil 17 causes the pole pieces 15 to magnetically couple the armature 19, rotating the armature 19 and driving a load.

The structure of the mercury rotative electrical connector drive 411 as shown in FIG. 14 will now be described. The structure of the load portion of the drive 411 including the sheaves 21, bearings 45, and armature 19 is identical to the load portion of the drive 11 which is described above with reference to FIG. 1. The structure of the hub 13, pole pieces 15, and coil 17 of the drive 411 is identical to the structure of the hub 13, pole pieces 15 and coil 17 of the drive 11 of FIG. 1 and is also identical to the hub 13, pole pieces 15 and coil 17 of the drive 211 of FIG. 11, both of which are described above. The fan 57 is coupled to the outer pole piece 15 with bolts 423 and rotates with the pole pieces 15 and the coil 17.

The mercury coupler 417 is coupled to the outer end of the hub 13. The outer housing 421 of the mercury coupler 417 is located in the cylindrical cavity 29 of the hub 13 opposite the shaft 31 of the motor 33. The outer housing 421 is secured to the hub 13 with a suitable adhesive. The outer housing 421 is rotated by the hub 13 along with the coil 17 and the pole pieces 15 when the hub 13 is rotated by the motor shaft 31. The inner housing 419 of the mercury coupler 417 extends out of the outer housing 421 away from the hub 13. The mercury coupler is thus located so that its axis of rotation is coaxial with the axis of rotation of the drive 411.

Contacts 425 extend from the outer housing 421 of the mercury coupler 417 so that the coil 17 may be electrically connected to the outer housing 421. Wires 427 couple to the contacts 425 and extend through the hub 13, fan 57 and pole pieces 15 to the coil 17. Contacts 429 extend from the inner housing 419 so that the inner housing 419 may be electrically connected to a power source.

Figure 15:
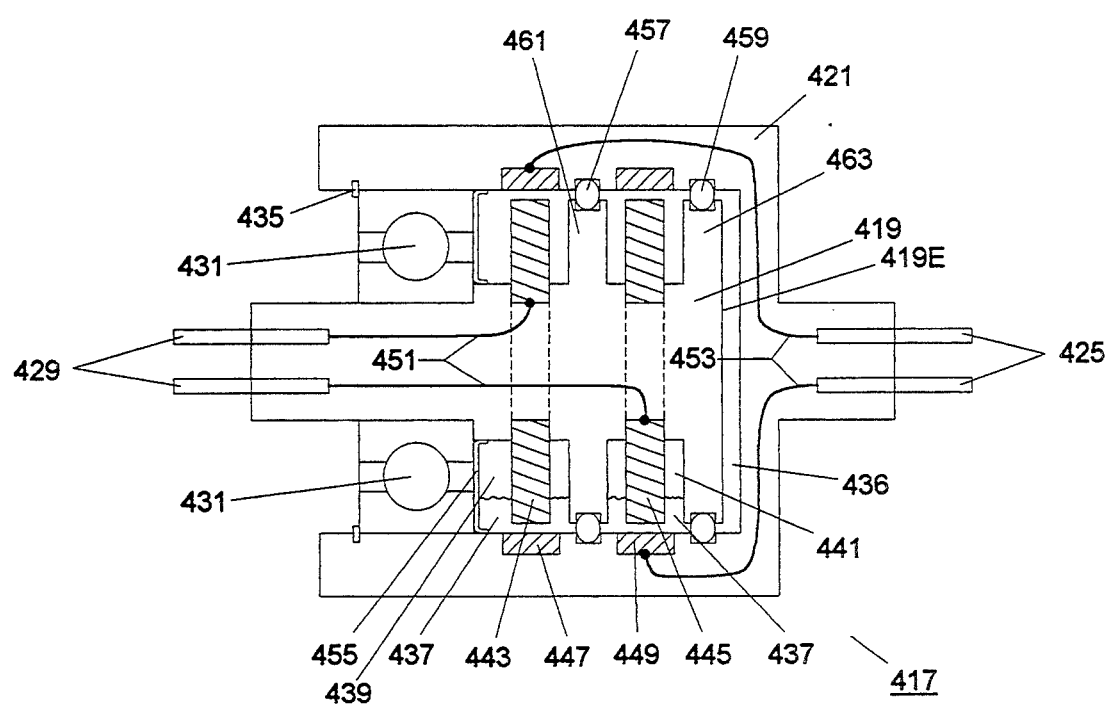
FIG. 15 is a partial cross-sectional side view of the liquid filled rotary coupler used in the embodiment of the drive of FIG. 14.

Referring now to FIG. 15, the mercury coupler 417 will be described in further detail. The mercury coupler 417 is conventional and commercially available. The outer housing 421 is rotatively located about the inner housing 419 on sealed bearings 431. The bearings 431 are pressed fit between the inner and outer housings 419 and 421. A snap ring 435 is on the outer end of the bearing 431. A gap 436 extends between the inner and outer housings 419 and 421 at the inner end of the inner housing 419E so that the housings 419 and 421 may move relative to each other.

The inner and outer housings 419 and 421 are electrically connected by mercury 437 or some other liquid conductor located in channels 439 and 441 which conductively couples inner contact rings 443 and 445 of the inner housing 419 and outer contact rings 447 and 449 of the outer housing 421. The respective contacts 429 are electrically connected to the respective inner contact rings 443 and 445 with wires 451 which extend through the inner housing 419. The inner contact rings 443 and 445 are secured to the inner housing 419 and extend from the inner housing 419 into the channels 439 and 441, respectively, a sufficient distance to contact the mercury 437 in the channels 439 and 441. The outer ring contacts 447 and 449 are located in the outer housing 421 adjacent the channels 439 and 441, respectively, so that the outer ring contacts 447 and 449 contact the mercury 437 in the channels 439 and 441. Respective contacts 425 are electrically connected to the respective outer ring contacts 447 and 449 with wires 453 which extend through the outer housing 421. The contacts 425 and 429, wires 451 and 453, inner contact rings 443 and 445, mercury 437, and outer contact rings 447 and 449 are arranged so that two continuous conductive paths may be formed through the coupler 417.

The mercury 437 is retained within the respective channels 439 and 441 by seals 455, 457 and 459. The channel 439 is formed between the sealed bearings 431, the outer housing 421, the inner housing 419, and a shoulder 461 of the inner housing 419. The seal 455 extends between the inner and outer housings 419 and 421 along the bearings 431 to prevent mercury 437 from seeping through the bearings 431. The seal 457 extends between the shoulder 461 and the outer housing 421 to prevent mercury 437 from moving between channel 439 and channel 441. The channel 441 is formed between the outer housing 421, the inner housing 419, the shoulder 461, and another shoulder 463 of the inner housing 419. The seal 459 extends between the shoulder 463 and the outer housing 421 to prevent mercury from escaping from channel 441 into the gap 436.

Referring back to FIG. 14, a bracket 465 is mounted to extend over the armature 19. The bracket 465 is mounted on bearings 467 so that the bracket 465 is held stationary relative to the coil 17, pole pieces 15, and the fan 57. The bearings 467 are mounted to the outer housing 421 of the mercury coupler 417. The inner face of the bearings 467 is held in place on the mercury coupler 417 by snap rings 469 and 471. The outer face of the bearings 467 is held in place by snap ring 473 and a shoulder 475 of the bracket 465. The bracket 465 extends radially outward from the bearings 467. At the outermost radial position of the bracket 465 an extension portion 101 of the bracket 465 extends back over the armature 19. A speed sensor 103 is mounted to the extension portion 101 to detect rotation of the armature 19.

In operation, the inner housing 419 is secured to a fixed platform, such as the motor 33, by way of a conduit, such as is shown in FIG. 1. Electrical current is supplied to the coil 17 by way of the coupling 417.

Although the coupling 417 has been described as having its outer housing 421 coupled to a rotating part of the drive, the outer housing could be coupled to a stationary platform and the inner housing 419 is then coupled to a rotating part (such as the hub) of the drive.

The power coupler devices of FIGS. 11, 13 and 14 could be used on a drive where the armature is coupled to the motor shaft (for example, by way of a hub) and the coil 17 and pole pieces are coupled to the load.

All of the drives 11, 111, 211, 311, 411 discussed above may be configured with various input and output structures. FIGS. 16–19 illustrate the various input and output configurations of the exemplary drive 211. However, the illustrated input/output configurations of drive 211 may also be utilized in the drives 11, 111 and 311.

Figure 16:
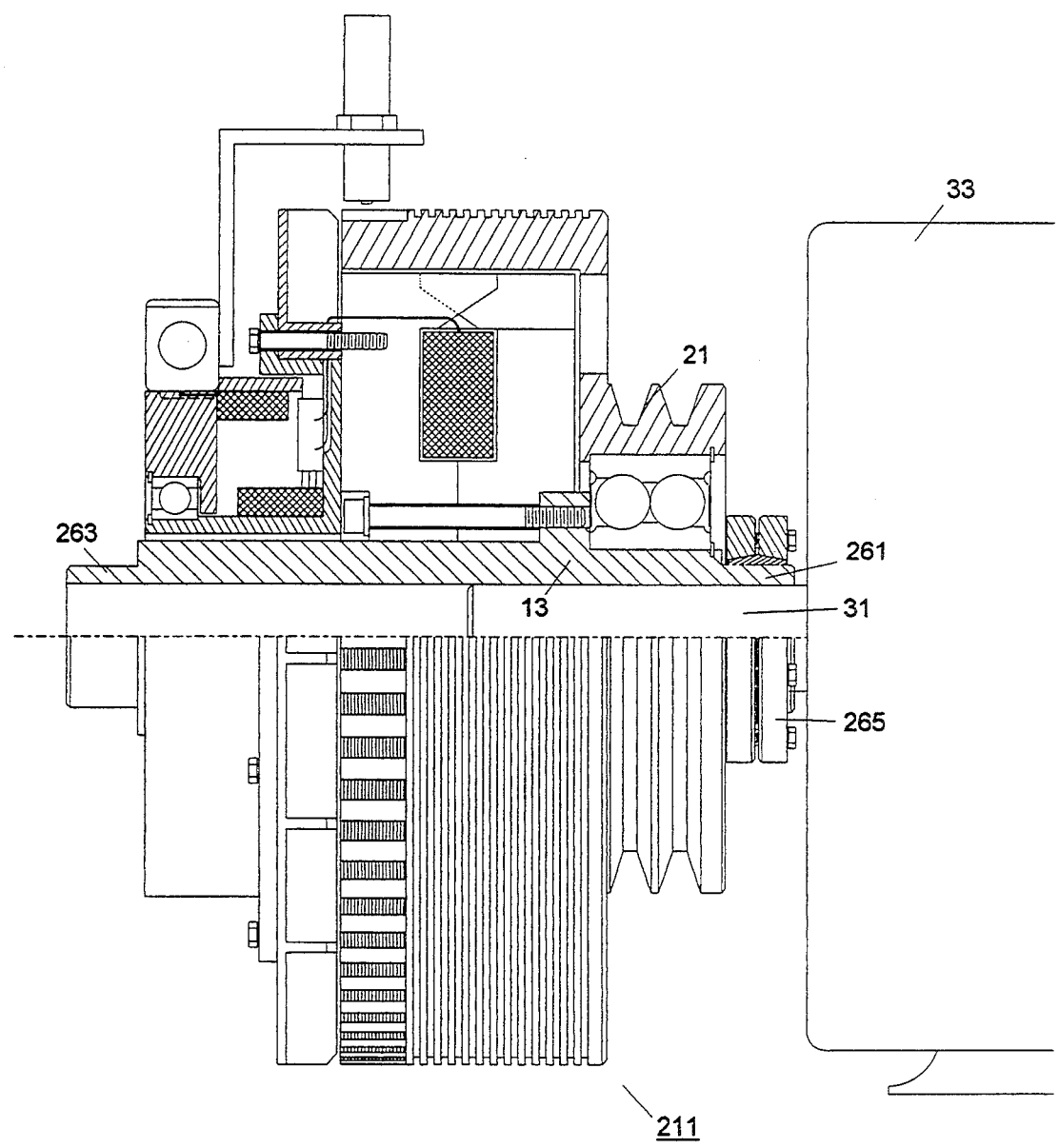
FIG. 16 is a cross-sectional side view of the drive of FIG. 11 illustrating another embodiment of the input/output mechanisms of the drive.

Referring now to FIG. 16, a through shaft version of the drive 211 is shown. The hub 13 extends completely through the drive. The motor 33 can be located at either end of the hub 13. The hub 13 accepts the motor shaft 31 at either end of the hub 13. The hub 13 has shoulders 261 and 263 at each end of the hub which are formed by sections of the hub having a narrower diameter than the body of the hub. The clamping device 265 may be clamped about either shoulder 261 or 263 to clamp the motor 33 to the hub 13. The through shaft configuration of the drive provides flexibility in the orientation of the drive with respect to the motor 33 and the load (which is coupled to the sheaves 21). The motor may be located at the same end of the drive as the sheaves 21 which drive the load, or the motor may be located at the opposite end of the drive from the sheaves 21.

Figure 17:
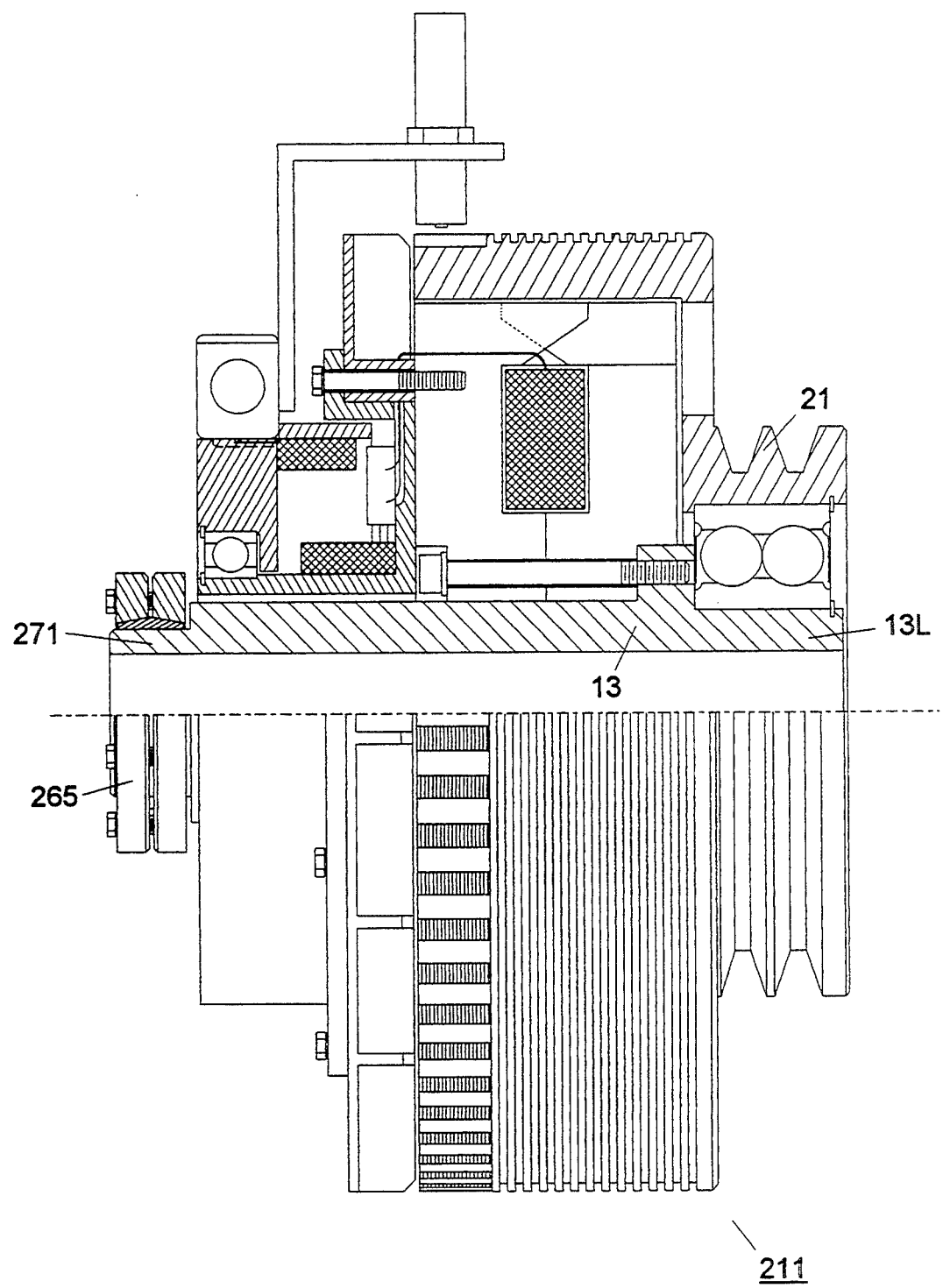
FIG. 17 is a cross-sectional side view of the drive of FIG. 11 illustrating a further embodiment of the input/output mechanisms of the drive.

Referring now to FIG. 17, an inverted sheave version of the drive 211 is shown. The hub 13 extends completely through the drive. The motor (not shown) is located at the opposite end of the drive from the sheaves 21 which drive the load. The hub 13 accepts the motor shaft (not shown) opposite the load end 13L of the hub. The hub 13 has a shoulder 271 at the end of the hub 13 which accepts the motor shaft. The clamping device 265 may be clamped about the shoulder 271 to clamp the motor to the hub 13. The inverted sheave drive is useful when the load is located in a confined area. The motor may be located away from the confined area and the sheaves 21 may be coupled to the load.

Figure 18:
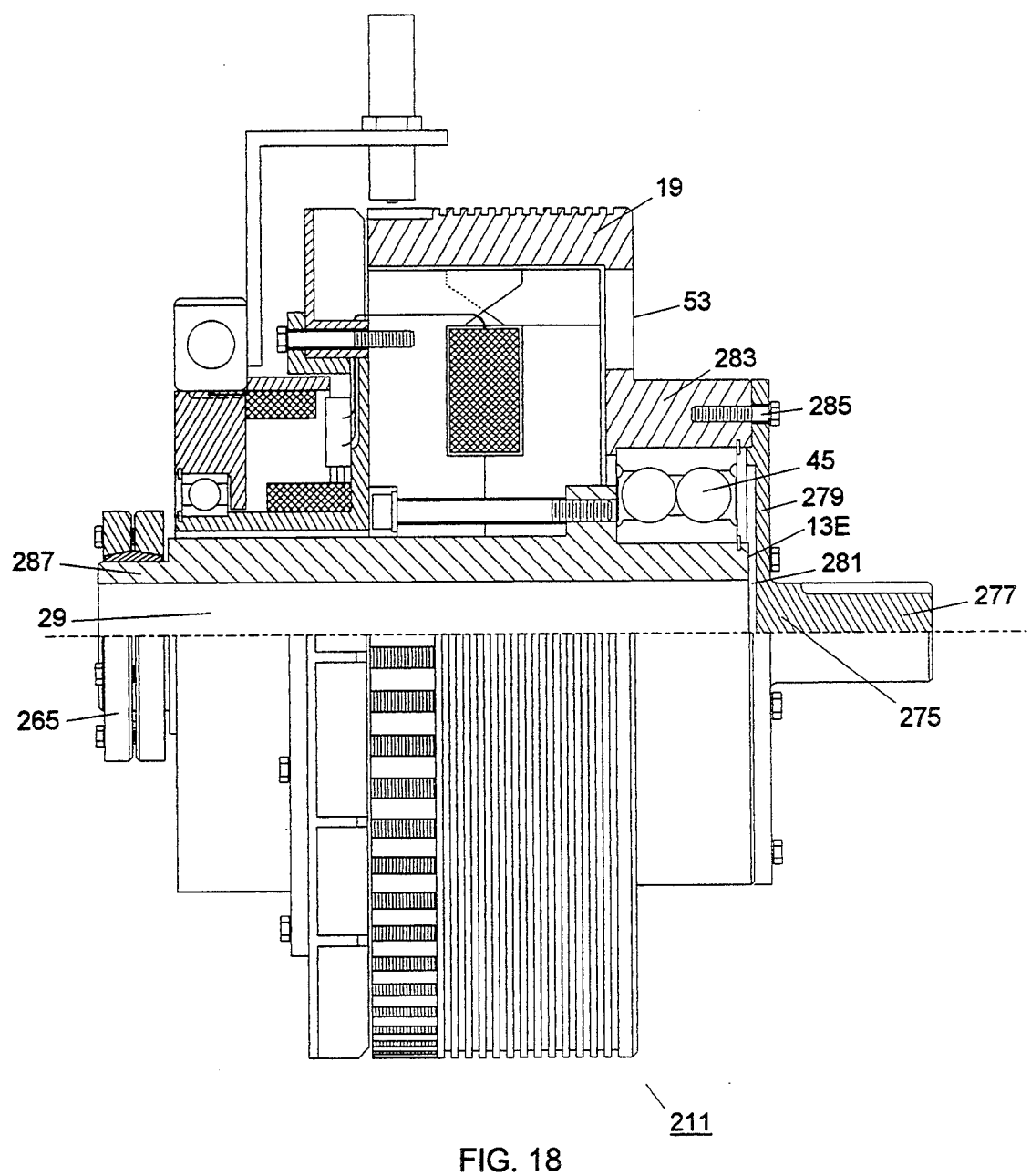
FIG. 18 is a cross-sectional side view of the drive of FIG. 11 illustrating a still further embodiment of the input/output mechanisms of the drive.

Referring now to FIG. 18, a shaft in-shaft out version of the drive 211 is shown. The motor shaft (not shown) provides the input to the drive and an output shaft 275 provides output from the drive. The output shaft 275 is used to drive the load. The output shaft 275 has a shaft portion 277 and a flange 279. The shaft portion 277 is aligned in line with the cylindrical cavity 29 of the hub 13 adjacent the end of the hub 13E separated from the hub by a gap 281 so that rotation of the hub 13 does not influence the shaft portion 275. The flange 279 integrally couples and extends radially from the shaft portion 277 adjacent the gap 281. The flange 279 is secured to a shaft mount 283 with bolts 285. The shaft mount 283 rides on bearings 45 and is coupled to the armature 19 by the radial wall 53. The shaft 275, therefore, is rotated by the armature 19 when the armature 19 is rotated due to magnetic coupling between the armature 19 and the pole pieces 15.

The motor (not shown) is coupled to the drive opposite the output shaft 275. The hub 13 receives the motor shaft in the cylindrical cavity 29 opposite the end of the hub 13E adjacent the shaft 275. The hub 13 has a shoulder 287 about which a clamping device 265 may be located for clamping the hub 13 to the motor. The motor and the output shaft 275 are located relative to one another so that the shaft in-shaft out drive may be coupled in line between the motor and the load. The shaft in-shaft out drive is useful for driving loads such as a pump or a gear box.

Figure 19:
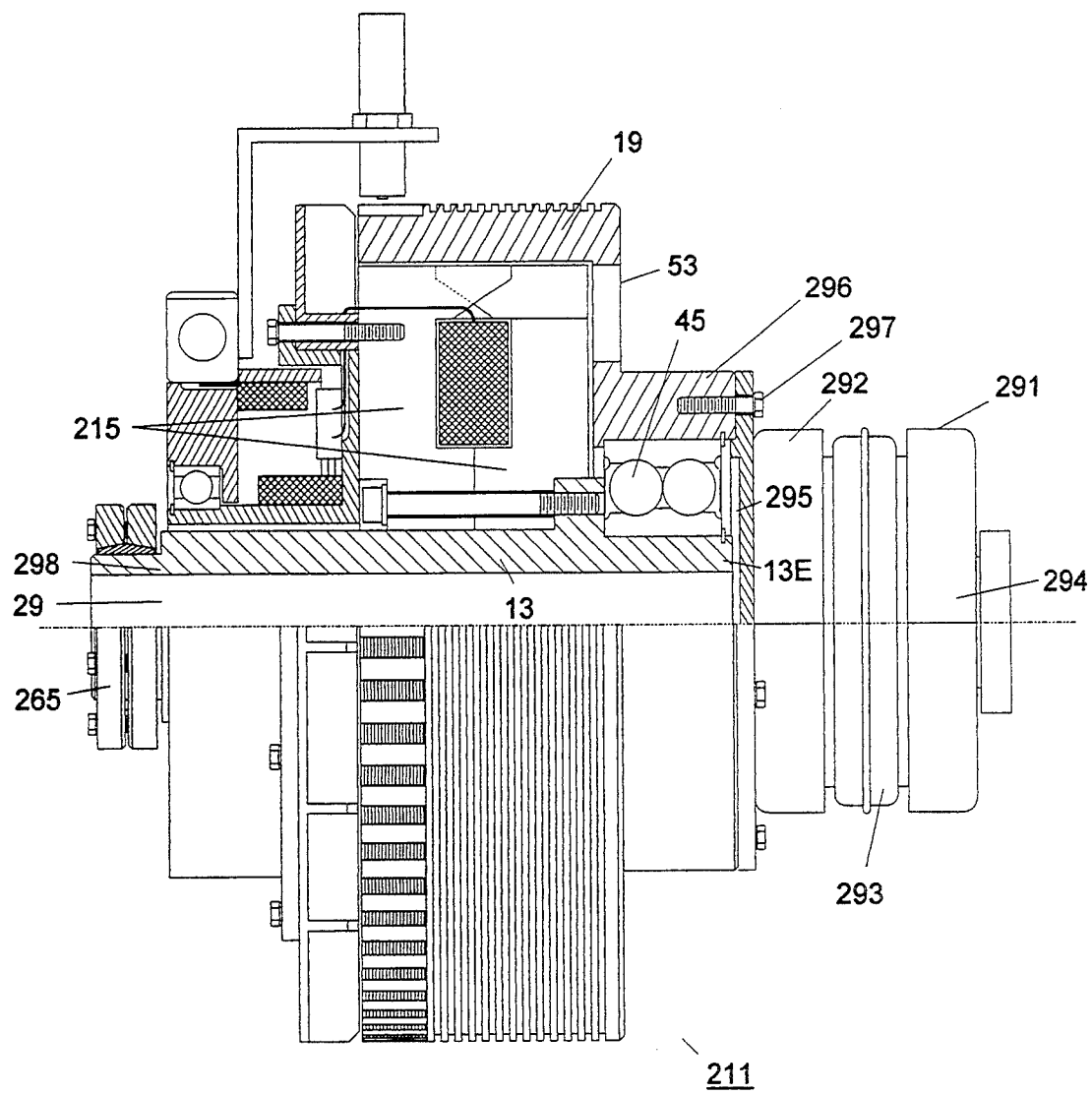
FIG. 19 is a cross-sectional side view of the drive of FIG. 11 illustrating a still further embodiment of the input/output mechanisms of the drive.

Referring now to FIG. 19, a shaft in-flexible coupling out version of the drive 211 is shown. The motor shaft (not shown) provides the input to the drive and the flexible coupling 291 provides output from the drive. The flexible coupling 291 is used to drive the load. Conventional commercially available flexible couplings such as that described in U.S. Pat. No. 3,283,535 may be used as the flexible coupling 291.

The flexible coupling 291 is located in line with the axis of the hub 13. The flexible coupling 291 has a rigid inner flanged portion 292, a flexible center portion 293, and a rigid load coupling portion 294. The inner flanged portion 292 is located adjacent an end of the hub 13E and bearings 45, separated from the hub and bearings 45 by a gap 295. The inner flanged portion 292 is coupled to a coupling mount 296 with bolts 297. The coupling mount 296 is located on the bearings 45 and is coupled to the armature 19 by the radial wall 53. The inner flanged portion 292, flexible center portion 293, and load coupling portion 294 are coupled together so that a load coupled to the load coupling portion 294 is joined to the armature through the flexible center portion 293 and the inner flanged portion 292. Therefore, the flexible coupling 291 is rotated by the armature 19 when the armature 19 is rotated due to magnetic coupling between the armature 19 and the pole pieces 15.

The motor (not shown) is coupled to the drive end that is opposite the flexible coupling 291. The hub 13 receives the motor shaft in the cylindrical cavity 29 opposite the end of the hub 13E adjacent the flexible coupling 291. The hub has a shoulder 298 about which a clamping device 265 may be located for clamping the hub to the motor. The motor and the flexible coupling 291 are located relative to one another so that the drive may be coupled generally in line between the motor and the load. The flexible center portion 293 of the flexible coupling 291 allows the load to be misaligned from an in-line position with respect to the motor. The shaft in-flexible coupling out drive is useful for driving loads such as pumps or gear boxes.

Although the present invention has been described as using Lundberg type of pole pieces, other types of magnetic poles could be used. For example, salient type poles could be used without departing from the spirit and scope of the present invention.

Figure 20:
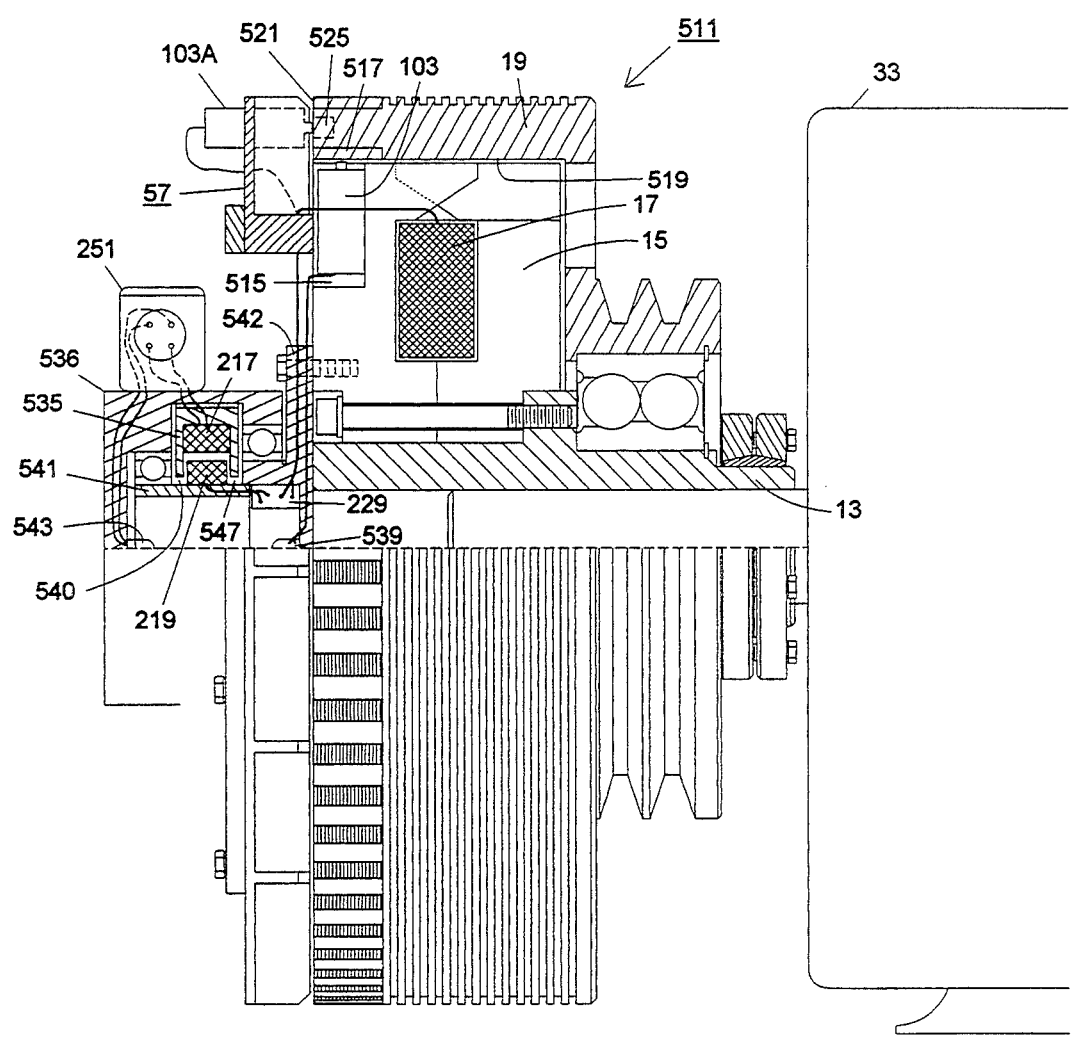
FIG. 20 is a partial cross-sectional side view of a drive, in accordance with another embodiment, showing a speed sensor mounted on a rotating part.

In FIG. 20, there is shown a drive 511 with a speed sensor 103 mounted to a rotating part. The speed sensor 103 is used to monitor the speed of the output member (such as the armature 19 and sheave assembly shown in FIG. 20). Traditionally, a speed sensor 103 has been mounted to a stationary or non-rotating part, such as is shown in FIG. 1. In such an arrangement, the speed sensor is stationary. Electrical wires directly connect the speed sensor to a control circuit 514 or to a monitoring circuit. The control circuit is typically mounted off of the drive and on a stationary platform.

However, in the drive 511 shown in FIG. 20, the speed sensor 103 is mounted to a rotating part. Thus, the speed sensor 103 can be mounted to either the armature 19 or to the pole pieces 15. When the speed sensor is mounted to one of the rotating members, notches are formed in the other rotating member. Thus, the differential speed between the two rotating portions (the armature and the pole pieces) of the drive is sensed.

For example, as shown in FIG. 20, the speed sensor 103 can be mounted in a cavity 515 in one of the pole pieces 15. Notches 517 are machined into the inside surface 519 of the armature 19 so as to form peaks and grooves as described above with reference to FIG. 2. The notches extend for a short distance from the end 521 of the armature. Alternatively, the speed sensor 103A can be mounted onto the fan 57, as shown by dashed lines in FIG. 20. Notches 525 are machined into the end 521 of the armature so as to form peaks and grooves as described with reference to FIG. 2. Wherever the speed sensor is located, the sensor head 523 of the speed sensor is located adjacent to the notches. A gap separates the sensor head from the notches so as to avoid direct contact.

Figure 21:
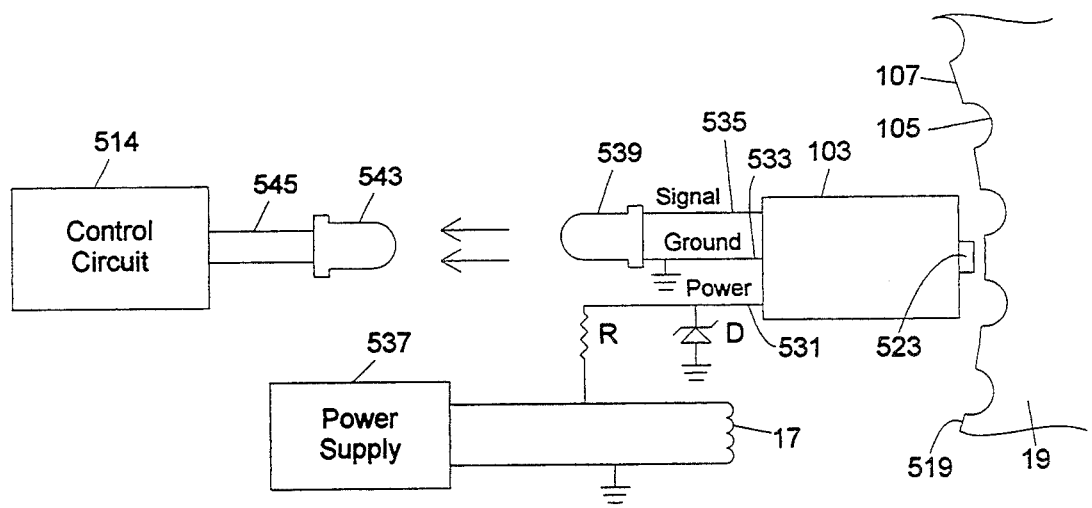
FIG. 21 is an electrical schematic diagram of the speed sensor arrangement of FIG. 20.

In the preferred embodiment, the speed sensor 103 is a magnetic variable reluctance sensor, which is conventional and commercially available. Referring to FIG. 21, the electrical connections of the speed sensor will be described. The speed sensor 103 is a three wire device, having the following wires: power 531, ground 533 and signal 535. The power and ground wires 531, 533 are connected to a power supply 537, in parallel with the eddy current coil 17. A dropping resistor R is placed in series with the power wire 531 and a zenor diode D is connected across the power and ground wires 531, 533. A voltage regulator could be used in place of the resistor and diode. The signal wire 535 is connected to a light source 539, such as a light emitting diode (LED). The LED is connected between the signal wire 535 and the ground wire 533.

Referring back to FIG. 20, the LED is located on a hollow end shaft 541. The rotatable end shaft 541 has a flange 542 which is coupled to the fan 57, the pole pieces 15 and the hub 13. Thus, the LED 539 rotates in unison with the speed sensor 103 and its power supply. As shown in FIG. 20, the power supply is a rotating coil 219 of a rotary transformer, which has been previously discussed with reference to FIG. 11. The cross-sectional shape of magnetically susceptible elements of FIG. 20 are different. The stationary member 535 is shaped like an inverted "U", creating air gaps 540, 547 between the stationary member and the end shaft 541.

The LED 539 is preferably located along the rotative axis of the drive. A light sensor 543 is located on a stationary housing 536, preferably along the same axis of rotation as the light source. In the preferred embodiment, the light sensor 543 is a photo transistor. Wires extend from the light sensor 543 to a junction box 251, where connections are made to the appropriate circuit. An air gap separates the LED 539 from the light sensor 543. The stationary housing 536 is anchored to a fixed platform in the manner previously discussed with reference to the other embodiments. Thus, the stationary housing 536 does not rotate.

In operation, the speed sensor 103 generates electrical pulses based on the differential speed between the armature and the pole pieces. Referring to FIG. 21, a pulse is generated whenever the sensor head 523 passes adjacent to a peak 107, followed by a notch 105 in the armature 19. The pulses generated by the speed sensor 103 are used to directly drive the LED 539. The LED 539 thus produces pulses of light in direct proportion to the electrical pulses produced by the speed sensor. Alternatively, the light source can produce a greater number or fewer number of pulses in proportion to each speed sensor pulse.

The light pulses are received by the photo transistor 543. The photo transistor converts the light pulses to electrical pulses, which are then transmitted to the control circuit 514 by wires 545.

The frequency of the pulses produced by the speed sensor 103 is proportional to the differential speed between the pole pieces 15 and the armature 19. If the armature 19 is not rotating at all, then the differential speed will be at a maximum speed (because the pole pieces are rotating at the same speed as the motor shaft) and the pulse frequency will be at a maximum frequency. If the armature is rotating at the same speed as the pole pieces, then the differential speed is 0 and the pulse frequency is 0. Intermediate armature speeds will produce intermediate pulse frequencies.

The speed sensor arrangement shown in FIG. 20 can be used with any power supply. For example, the rotary transformer shown in FIG. 11 can be used as the power supply. Specifically, the power supply includes the rotating coil 219 and bridge rectifier 229. The speed sensor 103 is connected to the output of the bridge rectifier 229. Alternatively, the power supply can include the coil 319 and bridge rectifier 329 of FIG. 13. Still another way to power the speed sensor is to connect the speed sensor to the coupling 417 of FIG. 14.

Figure 22:
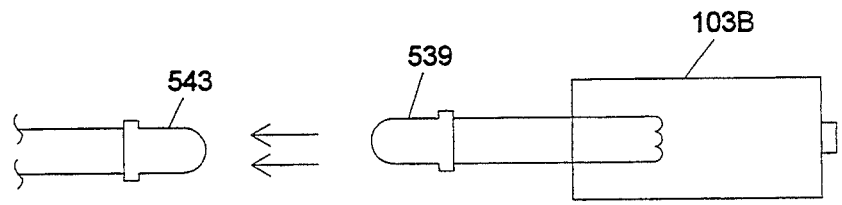
FIG. 22 is an electrical schematic diagram of another embodiment of the speed sensor arrangement of FIG. 20.

The speed sensor 103 shown in FIG. 21 is a three wire speed sensor. Such a speed sensor produces digital pulses. Other types of speed sensors can be used. For example, a two wire, self powered, speed sensor 103B can be used, as shown in FIG. 22. The speed sensor is not connected to the power supply. The speed sensor produces sine wave pulses which pulses drive the LED 539.

The foregoing disclosure and the showings made in the drawings are merely illustrative of the principles of this invention and are not to be interpreted in a limiting sense.

I claim:

1. A variable speed drive, comprising:
   a first rotatable member that comprises pole pieces and a drive coil;
   a second rotatable member that comprises an armature;
   one of said first rotatable member or said second rotatable member comprising a hub that is structured and arranged to be rotated by a motor, the other of said first rotatable member or said second rotatable member being structured and arranged to be coupled to a load;
   said pole pieces having plural interdigitated poles, said poles being separated from said armature by a gap;
   said drive coil located adjacent to said pole pieces, said pole pieces providing a path for a magnetic field produced by said drive coil;
   a first inductive coil coupled to said first rotatable member, said first inductive coil being electrically connected with said coil;
   a second inductive coil rotatably coupled to either of said first rotatable member or said second rotatable member;
   means for holding said second inductive coil stationary relative to said first inductive coil.

2. The variable speed drive of claim 1, wherein said hub has a first end and a second end, said hub first end being structured and arranged to be coupled to said motor, said other of said first rotatable member or said second rotatable member comprising an output shaft, said output shaft being located adjacent to said hub second end.

3. The variable speed drive of claim 1, wherein said hub has a first end and a second end, said hub first end being structured and arranged to be coupled to said motor, said other of said first rotatable member or said second rotatable member comprising a flexible coupling, said flexible coupling being located adjacent to said hub second end.

4. The variable speed drive of claim 1, further comprising:
   a first mounting member coupled to said first inductive coil;
   a second mounting member coupled to said second inductive coil;
   said first and second mounting members being made of a magnetically susceptible material, said first and second mounting members being separated from each other by a gap, wherein said first and second mounting members provide a magnetic path about said first and second inductive coils.

5. The variable speed drive of claim 4, wherein said second inductive coil is rotatably coupled to either of said first rotatable member or said second rotatable member by a bearing, said bearing being coupled to said first mounting member.

6. The variable speed drive of claim 1, wherein said pole pieces are first pole pieces, further comprising second pole pieces, one of said first inductive coil or said second inductive coil being located adjacent to said second pole pieces, said second pole pieces providing a path for a second magnetic field produced by said second inductive coil.

7. The variable speed drive of claim 6, wherein said second inductive coil is rotatably coupled to either of said first rotatable member or said second rotatable member by a bearing, said second pole pieces being coupled to said bearing.

8. The variable speed drive of claim 1, further comprising a rectifier electrically connected between said first inductive coil and said drive coil.

9. The variable speed drive of claim 1, wherein said second inductive coil is rotatably coupled to either of said first rotatable member or said second rotatable member by a bearing.

10. The variable speed drive of claim 1, wherein said hub has a first end and a second end, said hub first end being structured and arranged to be coupled to said motor, said first and second inductive coils being located adjacent to said hub second end.

11. The variable speed drive of claim 10, wherein said other of said first rotatable member or said second rotatable member that is structured and arranged to be coupled to a load further comprises a sheave, said sheave being located adjacent to said hub first end.

12. The variable speed drive of claim 1, wherein said hub has a first end and a second end, with said first and second inductive coils being located adjacent to said hub second end, and with both of said hub first and second ends being structured and arranged to be coupled to said motor so as to allow said motor to be connected to either one of said hub first and second ends.

13. A method of varying an output speed of a motor, comprising the steps of:
providing a output member that is rotatably coupled to a hub;
providing a drive coil and an armature with one of said drive coil or said armature being coupled to said hub and the other of said drive coil or said armature being structured and arranged to be coupled to a load;
mounting said hub onto a shaft of said motor;
rotating said hub at a first speed by said motor;
rotating a first coil in unison with said drive coil;
holding a second coil stationary with respect to said first coil;
inducing a current from said second coil into said first coil and energizing said drive coil from said first coil.

14. The method of claim 13 further comprising the step of varying the current provided by the second coil so as to vary a speed of said output member.

15. The method of claim 13 wherein the step of inducing a current from said second coil into said first coil further comprises the step of providing an alternating current to said second coil.

16. The method of claim 13 wherein the step of inducing a current from said second coil into said first coil further comprises the step of providing an direct current to said second coil.

17. The method of claim 13, further comprising the step of rectifying said induced current in said first coil and utilizing said rectified current to energize said drive coil.

* * * * *